United States Patent
Beales et al.

(10) Patent No.: US 10,534,696 B1
(45) Date of Patent: *Jan. 14, 2020

(54) SYSTEMS AND METHODS FOR IMPROVING COMPARATIVE PERFORMANCE TEST RESULTS OF MOBILE APPLICATIONS

(71) Applicant: Facebook, Inc., Menlo Park, CA (US)

(72) Inventors: Joel F. Beales, Seattle, WA (US); Jeffrey Scott Dunn, Seattle, WA (US); Jia Li, Redmond, WA (US); Shai Duvdevani, Seattle, WA (US); Scott Kenneth Yost, Bothell, WA (US); Donghang Guo, Redmond, WA (US); Le Zhang, Bellevue, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/168,149

(22) Filed: Oct. 23, 2018

Related U.S. Application Data

(63) Continuation of application No. 15/690,010, filed on Aug. 29, 2017, now Pat. No. 10,146,666.

(51) Int. Cl.
   *G06F 9/44* (2018.01)
   *G06F 11/36* (2006.01)
(52) U.S. Cl.
   CPC ...... *G06F 11/3664* (2013.01); *G06F 11/3688* (2013.01)
(58) Field of Classification Search
   CPC .......................... G06F 11/3664; G06F 11/3688
   See application file for complete search history.

(56) References Cited

U.S. PATENT DOCUMENTS 6,966,013 B2 11/2005 Blum et al.
7,840,944 B2 11/2010 Brunswig et al.
(Continued)

OTHER PUBLICATIONS

Young-Min Baek and Doo-Hwan Bae, Automated Model-Based Android GUI Testing using Multi-level GUI Comparison Criteria, ACM, 2016, retrieved online on Sep. 3, 2019, pp. 238-249. Retrieved from the Internet: <URL: http://delivery.acm.org/10.1145/2980000/2970313/p238-baek.pdf?>. (Year: 2016).*

(Continued)

*Primary Examiner* — Hanh Thi-Minh Bui
(74) *Attorney, Agent, or Firm* — FisherBroyles, LLP

(57) ABSTRACT

A computer-implemented method for improving comparative performance test results of mobile applications may include (1) determining an optimum testing configuration for a mobile computing device, (2) directing the mobile computing device to (a) execute a comparative performance test, (b) operate in accordance with the determined optimum testing configuration during the execution of the comparative performance test, and (c) write data generated during the execution of the comparative performance test to a random-access memory (RAM) drive of the mobile computing device, (3) recording a network response directed to the mobile computing device, (4) detecting a subsequent network request sent by the mobile computing device, (5) sending the recorded network response to the mobile computing device in response to detecting the subsequent network request, and (6) tracking a control performance value and a modified performance value during the comparative performance test. Various other methods and systems are also disclosed.

18 Claims, 15 Drawing Sheets

(56) References Cited

U.S. PATENT DOCUMENTS

| | | |
|---|---|---|
| 9,558,106 B1 | 1/2017 | Moniz et al. |
| 2007/0006041 A1 | 1/2007 | Brunswig et al. |
| 2016/0358103 A1 | 12/2016 | Bowers et al. |
| 2019/0079850 A1* | 3/2019 | Zhang .................. G06F 8/34 |

OTHER PUBLICATIONS

Byron, Lee, "GraphQL: A data query language", URL: https://code.facebook.com/posts/1691455094417024/graphql-a-data-query-language/, Core Data, Developer Tools, Sep. 14, 2015, 5 pages.

Dunn, Jeffrey, "Introducing FBLearner Flow: Facebook's AI backbone", URL: https://code.facebook.com/posts/1072626246134461/introducing-fblearner-flow-facebook-s-ai-backbone/, Core Data, ML Applications, May 9, 2016, 9 pages.

Abraham et al., "Scuba: Diving into Data at Facebook", URL: https://research.fb.com/wp-content/uploads/2016/11/scuba-diving-into-data-at-facebook.pdf, Proceedings of the VLDB Endowment, vol. 6, No. 11, Aug. 26-30, 2013, 11 pages.

Wikipedia, "Bisection (software engineering)", URL: https://en.wikipedia.org/wiki/Bisection_(software_engineering), Encyclopedia, 2017, 2 pages.

Wikipedia, "Regression Testing", URL: https://en.wikipedia.org/wiki/Regression_testing, Encyclopedia, 2017, 4 pages.

Nguyen et al., "An Industrial Case Study of Automatically Identifying Performance Regression-Causes", URL: http://delivery.acm.org/10.1145/2600000/2597092/p232-nguyen.pdf?, MSR'14, ACM, May 31-Jun. 1, 2014, 10 pages.

* cited by examiner

```
1200
  ↳
1202 {
    person {
      name
      friends {
        name
      }
    }
}

1204 {
    "data": {
      "person": {
        "name": "Alan Fitzgerald",
        "friends": [
          {
            "name": "Bibiana Sarabia"
          },
          {
            "name": "Charles Jones"
          },
          {
            "name": "Danny Chang"
          }
        ]
      }
    }
}

1206 {
    "data": {
      "hero": {
        "name": "Alan Fitzgerald",
        "friends": []
      }
    }
}
```

*FIG. 12*

SYSTEMS AND METHODS FOR IMPROVING COMPARATIVE PERFORMANCE TEST RESULTS OF MOBILE APPLICATIONS

CROSS REFERENCE TO RELATED APPLICATION

This application is a continuation of U.S. patent application Ser. No. 15/690,010, entitled "SYSTEMS AND METHODS FOR IMPROVING COMPARATIVE PERFORMANCE TEST RESULTS OF MOBILE APPLICATIONS," filed on Aug. 29, 2017, which is incorporated herein by reference in its entirety.

BACKGROUND

When application developers introduce changes into applications (e.g., source code changes associated with applications), such changes often have unexpected consequences. For example, application changes may cause errors or reductions in application performance. Testing applications after changes have been made may be useful for determining whether the changes resolve previously detected errors (i.e., "bugs"), whether the changes have introduced new errors, whether changes cause reductions in various performance metrics associated with the applications, and so forth. Such testing is commonly referred to as "regression testing."

Unfortunately, various factors such as complexity inherent in modern mobile applications, variability in mobile computing devices, and instability of network resources may introduce unacceptable levels of noise and wide inconsistencies in regression test results for mobile applications, reducing the usefulness of such regression test results in identifying and resolving errors and reductions in performance metrics.

SUMMARY

As will be described in greater detail below, the instant disclosure describes various systems and methods for improving comparative performance test results of mobile applications by removing noise from and increasing consistency in regression test results.

In one example, a computer-implemented method for improving comparative performance test results of mobile applications may include (1) determining, by a performance test management system, an optimum testing configuration for a mobile computing device, and (2) directing, by the performance test management system, the mobile computing device to (a) execute a comparative performance test of a control build of a program and a modified build of a the program, (b) operate in accordance with the determined optimum testing configuration during the execution of the comparative performance test, and (c) write data generated by the control build of the program and the modified build of the program to a random-access memory (RAM) drive of the mobile computing device during the execution of the comparative performance test. The method may also include (1) recording, by the performance test management system during a warm-up period of the comparative performance test, a network response directed to the mobile computing device from a network computing device external to the mobile computing device in response to an initial network request sent by the mobile computing device during the warm-up period of the comparative performance test, (2) detecting, by the performance test management system during an evaluation period of the comparative performance test, a subsequent network request sent by the mobile computing device that corresponds to the initial network request sent by the mobile computing device during the warm-up period, (3) sending, by the performance test management system during the evaluation period of the comparative performance test, the recorded network response to the mobile computing device in response to detecting the subsequent network request sent by the mobile computing device, and (4) tracking, by the performance test management system during the evaluation period of the comparative performance test, (a) a control performance value associated with the control build of the program, and (b) a modified performance value associated with the modified build of the program.

In some embodiments, the mobile computing device may include a central processing unit (CPU) and a graphics processing unit (GPU), and the optimum testing configuration may include a specified CPU clock speed and a specified GPU clock speed. When the mobile computing device executes the comparative performance test, and (1) the CPU operates at the specified CPU clock speed during the execution of the comparative performance test and (2) the GPU operates at the specified GPU clock speed during the execution of the comparative performance test, a thermal throttling feature of the mobile computing device may not be engaged during the execution of the comparative performance test. Determining the optimum testing configuration for the mobile computing device may include identifying the specified CPU clock speed and the specified GPU clock speed based on a previous execution of the comparative performance test by the mobile computing device.

In some embodiments, determining the optimum testing configuration may include identifying a feature of the mobile computing device that, when engaged during the execution of the comparative performance test, causes an inconsistent result in the comparative performance test. In this example, directing the mobile computing device to operate in accordance with the determined optimum testing configuration may include directing the mobile computing device to disable the identified feature. In at least one embodiment, the feature of the mobile computing device that, when engaged during the execution of the comparative performance test, causes an inconsistent result in the comparative performance test may include at least one of a feature of an operating system, a feature of a program configured to be executed by the mobile computing device, a gyroscope sensor, a global positioning system sensor, an accelerometer, a proximity sensor, a barometer, a network interface, or a security sensor.

In some embodiments, directing the mobile computing device to execute the comparative performance test may include setting the mobile computing device to a starting data state associated with the comparative performance test. In some embodiments, directing the mobile computing device to execute the comparative performance test may further include (1) directing the mobile computing device to execute, at least once, a set of test operations using the control build of the program, and (2) resetting, after each execution of the set of test operations using the control build of the program, the mobile computing device to the starting data state. In some embodiments, directing the mobile computing device to execute the comparative performance test may further include directing the mobile computing device to (1) execute, at least once, the set of test operations using the modified build of the program, and (2) resetting, after each execution of the set of test operations using the modified build of the program, the mobile computing device to the starting data state.

In some embodiments, the method may further include (1) comparing, by the performance test management system, the control performance value with the modified performance value, and (2) determining, by the performance testing management system, that a difference between the modified build and the control build introduces a regression into the modified build based on the comparison of the control performance value with the modified performance value.

In at least one embodiment, directing the mobile computing device to execute the comparative performance test may include directing the mobile computing device to: (1) generate a graphical user interface (GUI) frame using the control build, and (2) generate the GUI frame using the modified build. In some examples, the control performance value associated with the control build of the program may include a control generation time indicating a duration of time the mobile computing device took to generate the GUI frame using the control build, and the modified performance value associated with the modified build of the program may include a modified generation time indicating a duration of time the mobile computing device took to generate the GUI frame using the modified build.

In at least one embodiment, the method may further include preventing, by the performance test management system, the mobile computing device from writing the data generated by the control build of the program and the data generated by the modified build of the program to a physical drive during the execution of the comparative performance test. In some such embodiments, the method may further include preventing, by the performance test management system, the mobile computing device from receiving subsequent network response from the network computing device during the evaluation period of the comparative performance test.

In some embodiments, the initial network request may include a GRAPHQL query, and the network response may include a response to the GRAPHQL query. In such examples, the method may further include removing, by the performance test management system, a part of the response to the GRAPHQL query from the network response prior to sending the network response to the mobile computing device.

In at least one embodiment, a computer-implemented method for improving comparative performance test results of mobile applications may include directing, by a performance test management system, a mobile computing device to execute a comparative performance test using a control build of a program and a modified build of the program by directing the mobile computing device to (1) generate a GUI frame using the control build, and (2) generate the GUI frame using the modified build. The method may also include tracking, by the performance test management system, (1) a control generation time indicating a duration of time the mobile computing device took to generate the GUI frame using the control build, and (2) a modified generation time indicating a duration of time that mobile computing device took to generate the GUI frame using the modified build. The method may further include (1) comparing, by the performance test management system, the control generation time with the modified generation time, and (2) determining, by the performance test management system, that a difference between the modified build and the control build introduces a regression into the modified build based on the comparison of the control generation time and the modified generation time.

A corresponding system for improving comparative performance test results of mobile applications may include (1) a determining module, stored in memory, that determines an optimum testing configuration for a mobile computing device, and (2) a directing module, stored in memory, that directs the mobile computing device to (a) execute a comparative performance test of a control build of a program and a modified build of the program, (b) operate in accordance with the determined optimum testing configuration during the execution of the comparative performance test, and (3) write data generated by the control build of the program and the modified build of the program to a random-access memory (RAM) drive of the mobile computing device during the execution of the comparative performance test. The system may further include (1) a recording module, stored in memory, that records, during a warm-up period of the comparative performance test, a network response directed to the mobile computing device from a network computing device external to the mobile computing device in response to an initial network request sent by the mobile computing device during the warm-up period of the comparative performance test, (2) a detecting module that detects, during an evaluation period of the comparative performance test, a subsequent network request sent by the mobile computing device that corresponds to the initial network request sent by the mobile computing device during the warm-up period, (3) a sending module, stored in memory, that sends, during the evaluation period of the comparative performance test, the recorded network response to the mobile computing device in response to detecting the subsequent network request sent by the mobile computing device, (4) a tracking module, stored in memory, that tracks, during the evaluation period of the comparative performance test (a) a control performance value associated with the control build of the program, and (b) a modified performance value associated with the modified build of the program, and (5) at least one physical processor that executes the determining module, the directing module, the recording module, the detecting module, the sending module, and the tracking module.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 12 illustrates exemplary GRAPHQL queries and responses that a system for improving comparative performance test results of mobile applications may receive, modify, and send.

Figure 1:
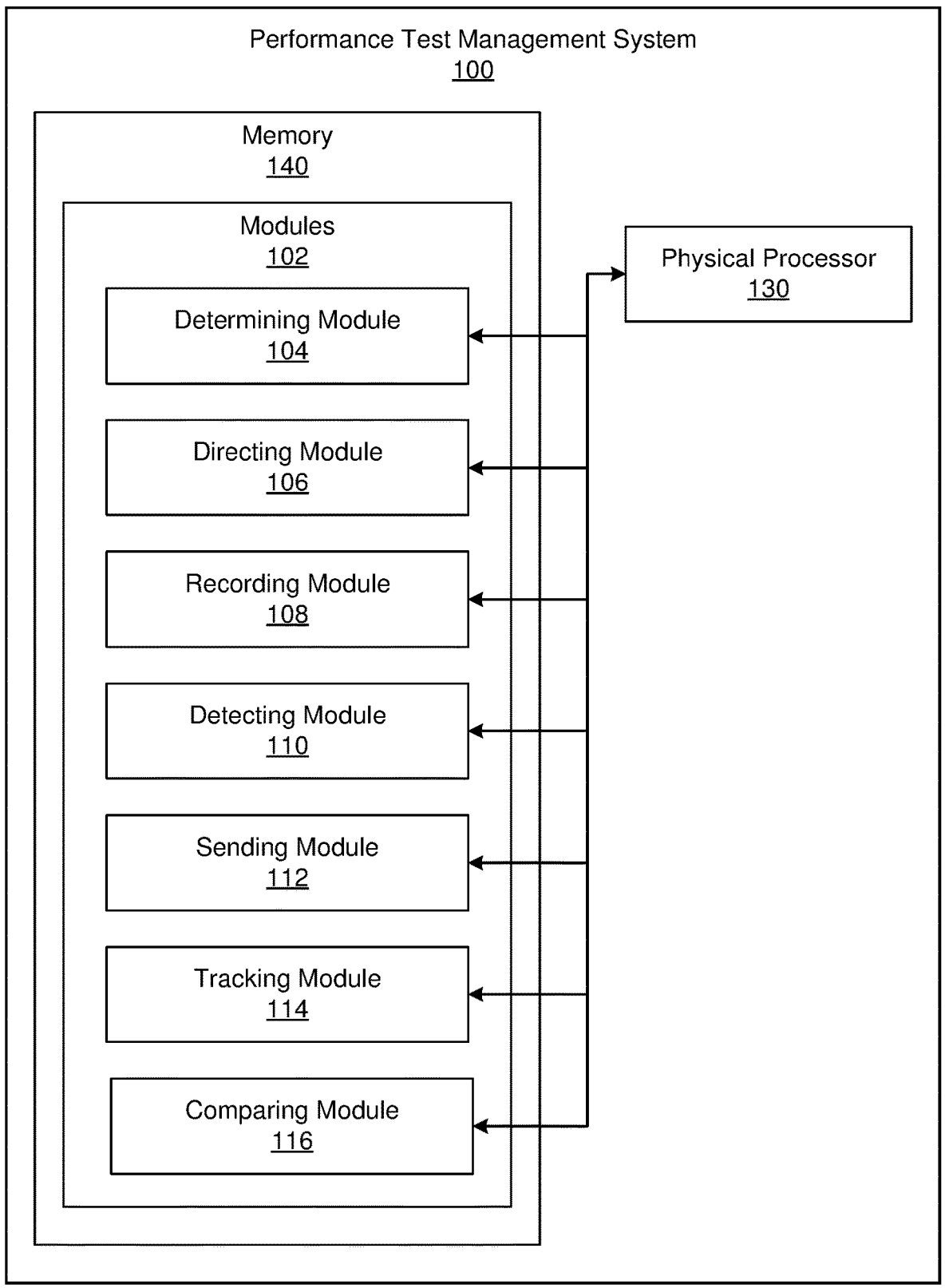
FIG. 1 is a block diagram of an exemplary system for improving comparative performance test results of mobile applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for improving regression test results of mobile applications. As will be explained in greater detail below, the systems and methods described herein may determine an optimum testing configuration of a mobile computing device and direct the mobile computing device to execute a comparative performance test of a control build of a program and a modified build of the program. During the execution of the comparative performance test, the mobile computing device may be directed to operate in accordance with the determined optimum testing configuration and write data generated by the control and modified builds during the execution of the comparative performance test to a RAM drive of the mobile computing device. During a warm-up period of the comparative performance test, the disclosed systems and methods may record a network response directed to the mobile computing device from a network computing device external to the mobile computing device in response to an initial network request sent by the mobile computing device during the warm-up period of the comparative performance test. Additionally, during an evaluation period of the comparative performance test, systems and methods may detect a subsequent network request sent by the mobile computing device that corresponds to the initial network request sent by the mobile computing device during the warm-up period. In response to detecting the subsequent network request sent by the mobile computing device, the systems and methods may send, during the evaluation period of the comparative performance test, the recorded network response to the mobile computing device. During the evaluation period of the comparative performance test, the disclosed systems and methods may track a control performance value associated with the control build of the program and a modified performance value associated with the modified build of the program.

By determining an optimum testing configuration of a mobile computing device and directing the mobile computing device to operate in accordance with that optimum testing configuration during the execution of a comparative performance test, features of the mobile computing device that may introduce inconsistencies in test results (e.g., thermal throttling of a CPU/GPU, location services, and so forth) may be disabled, thereby eliminating those features as sources of inconsistency and/or noise in comparative performance test results. Further, by directing the mobile computing device to write data generated by the control build of the program and the modified build of the program to a RAM drive of the mobile computing device instead of to a physical drive, variations in write speed of the physical drive may also be eliminated as sources of inconsistency and/or noise in results of the comparative performance test. Additionally, the systems and methods described herein may isolate the mobile computing device from variations in network speeds and resource availability during an execution of a comparative performance test, thereby further improving consistency of—and reducing noise in—comparative performance test results.

The following will provide, with reference to FIGS. 1-2 and FIGS. 4-14, detailed descriptions of systems for improving comparative performance test results of mobile applications. Detailed descriptions of corresponding computer-implemented methods will also be provided in connection with FIGS. 3 and 15.

FIG. 1 is a block diagram of a performance test management system 100 ("system 100") for improving comparative performance test results of mobile applications. As illustrated in this figure, exemplary system 100 may include one or more modules 102 for performing one or more tasks. As will be explained in greater detail below, modules 102 may include a determining module 104 that determines an optimum testing configuration for a mobile computing device.

Additionally, exemplary system 100 may include a directing module 106 that directs the mobile computing device to execute a comparative performance test of a control build of a program and a modified build of the program. In some embodiments, directing module 106 may additionally direct the mobile computing device to operate in accordance with an optimum testing configuration previously determined by determining module 104 during the execution of the comparative performance test. In some embodiments, directing module 106 may further direct the mobile computing device to write data generated by the control build of the program and the modified build of the program to a RAM drive of the mobile computing device during the execution of the comparative performance test. Exemplary system 100 may also include a recording module 108 that records, during a warm-up period of a comparative performance test, a network response directed to the mobile computing device from a network computing device external to the mobile computing device in response to an initial network request sent by the mobile computing device during the warm-up period of the comparative performance test.

Exemplary system 100 may further include a detecting module 110 that detects, during an evaluation period of a comparative performance test, a subsequent network request sent by the mobile computing device that corresponds to the initial network request sent by the mobile computing device during the warm-up period. Exemplary system 100 may also include a sending module 112 that sends, during the evaluation period of the comparative performance test, the recorded network response to the mobile computing device in response to detecting the subsequent network request sent by the mobile computing device. Additionally, exemplary system 100 may include a tracking module 114 that tracks, during the evaluation period of the comparative performance test, (1) a control performance value associated with the control build of the program and (2) a modified performance value associated with the modified build of the program. In some embodiments, exemplary system 100 may also include a comparing module 116 that compares the control performance value with the modified performance value. In some embodiments, comparing module 116 may additionally or alternatively determine that a difference between the modified build and the control build introduces a regression into the modified build based on the comparison of the control performance value with the modified performance value.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As further illustrated in FIG. 1, exemplary system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate improving comparative performance test results of mobile applications. Examples of physical processor 130 include, without limitation, microprocessors, microcontrollers, CPUs, Field-Programmable Gate Arrays (FPGAs) that implement softcore processors, Application-Specific Integrated Circuits (ASICs), portions of one or more of the same, variations or combinations of one or more of the same, or any other suitable physical processor.

Figure 2:
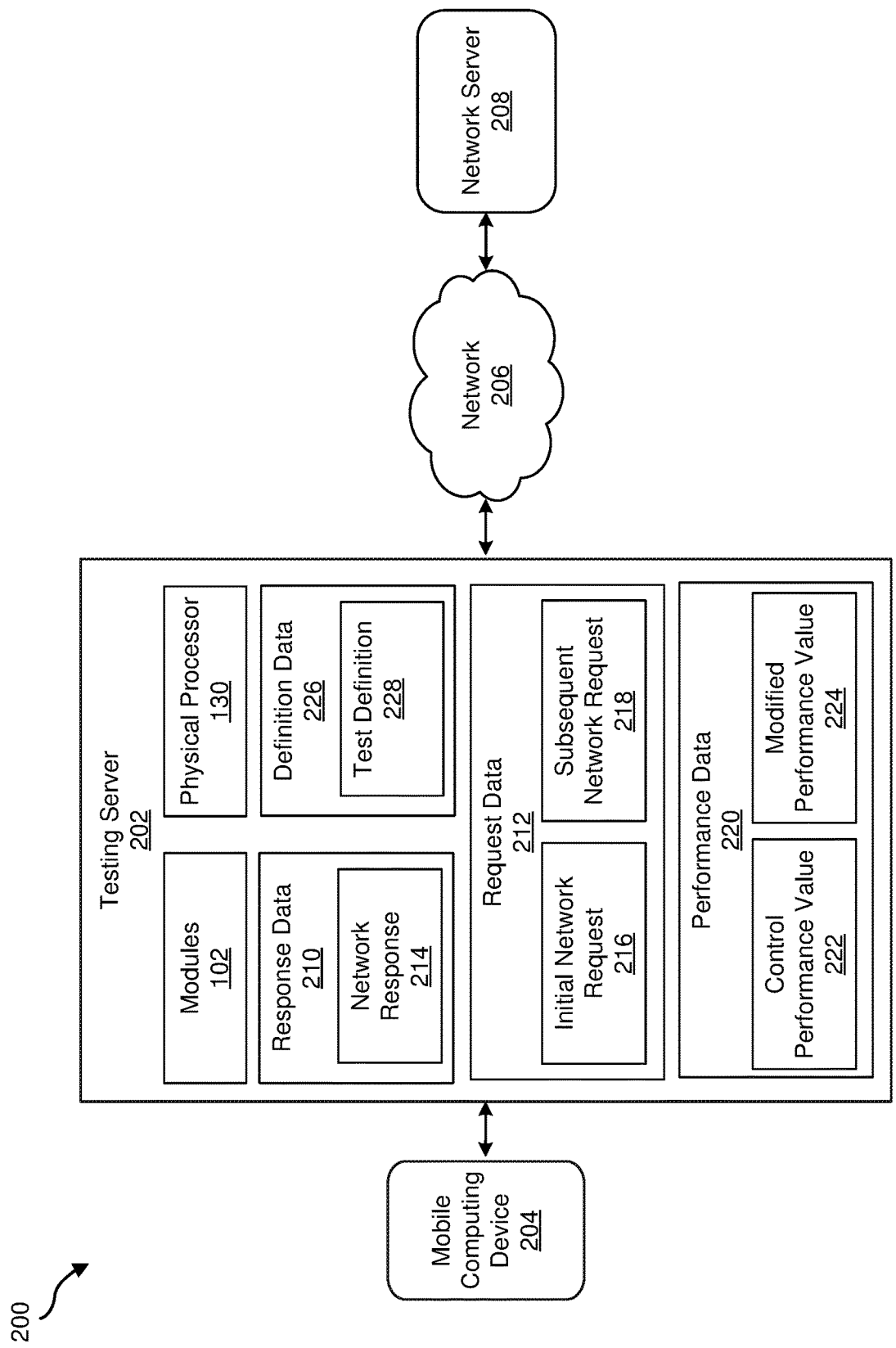
FIG. 2 is a block diagram of an exemplary implementation of a system for improving comparative performance test results of mobile applications.

Exemplary system 100 in FIG. 1 may be implemented in a variety of ways. For example, all or a portion of exemplary system 100 may represent portions of exemplary system 200 in FIG. 2. As shown in FIG. 2, system 200 may include a testing server 202 in communication with a mobile computing device 204. Testing server 202 may be in communication with mobile computing device in any suitable way, including but not limited to by way of a physical connection (e.g., USB, APPLE LIGHTNING, serial, etc.) and/or a network connection. In some embodiments, testing server 202 may communicate with mobile computing device 204 by way of network 206. Testing server 202 may further be in communication with a network server 208 via a network 206.

In at least one example, testing server 202 may be programmed with one or more of modules 102. Additionally or alternatively, mobile computing device 204 and/or network server 208 may be programmed with one or more of modules 102.

In one embodiment, one or more modules 102 from FIG. 1 may, when executed by at least one processor of testing server 202, mobile computing device 204, and/or network server 208, enable testing server 202, mobile computing device 204, and/or network server 208 to improving comparative performance test results of mobile applications. For example, as will be described in greater detail below, determining module 104 may cause testing server 202, mobile computing device 204, and/or network server 208 to determine an optimum testing configuration for mobile computing device 204. Subsequently, directing module 106 may direct mobile computing device 204 to (1) execute a comparative performance test of a control build of a program and a modified build of the program, (2) operate in accordance with the determined optimum testing configuration during the execution of the comparative performance test, and (3) write data generated by the control build of the program and the modified build of the program to a RAM drive of mobile computing device 204 during the execution of the comparative performance test.

In some embodiments, one or more modules 102 may cause testing server 202, mobile computing device 204, and/or network server 208 to record and/or send response data 210 and/or request data 212. For example, in some embodiments, recording module 108 may also cause testing server 202, mobile computing device 204, and/or network server 208 to, during a warm-up period of the comparative performance test, record a network response (e.g., network response 214) directed to mobile computing device 204 from network server 208 in response to an initial network request (e.g., initial network request 216) sent by mobile computing device 204 to network server 208 during the warm-up period of the comparative performance test. Detecting module 110 may also cause testing server 202, mobile computing device 204, and/or network server 208 to detect, during an evaluation period of the comparative performance test, a subsequent network request (e.g., subsequent network request 218) sent by mobile computing device 204 to network server 208 that corresponds to the initial network request (e.g., initial network request 216) sent to network server 208 by mobile computing device 204 during the warm-up period. Sending module 112 may then cause testing server 202, mobile computing device 204, and/or network server 208 to send, during the evaluation period of the comparative performance test, the recorded network response (e.g., network response 214) to mobile computing device 204 in response to detecting the subsequent network request sent by mobile computing device 204. This may be done while one or more of modules 102 (e.g., sending module 112) also causes testing server 202, mobile computing device 204, and/or network server 208 to prevent mobile computing device 204 from receiving a subsequent response from network server 208 during the evaluation period of the comparative performance test.

During the evaluation period of the comparative performance test (e.g., while mobile computing device 204 executes the evaluation portion of the comparative performance test), tracking module 114 may cause testing server 202, mobile computing device 204, and/or network server 208 to track (e.g., store, access, and so forth) performance data 220 associated with the comparative performance test. For example, in some embodiments, tracking module 114 may cause testing server 202, mobile computing device 204, and/or network server 208 to track (1) a control performance value (e.g., control performance value 222) associated with the control build of the program, and (2) a modified performance value (e.g., modified performance value 224) associated with the modified build of the program. At a point in time subsequent to the comparative performance test, comparing module 116 may cause testing server 202, mobile computing device 204, and/or network server 208 to compare the control performance value (e.g., control performance value 222) with the modified performance value (e.g., modified performance value 224), and determining module 118 may cause testing server 202, mobile computing device 204, and/or network server 208 to determine that a difference between the modified build and the control build introduces a regression in to the modified build based on the comparison of the control performance value (e.g., control performance value 222) with the modified performance value (e.g., modified performance value 224).

In at least some embodiments, one or more modules 102 may additionally receive definition data 226. For example, in some embodiments, one or more modules 102 may cause testing server 202, mobile computing device 204, and/or network server 208 to receive a test definition 228 that defines one or more parameters for a comparative performance test. One or more modules 102 may utilize test definition 228 in various ways as described herein.

Testing server 202 generally represents any type or form of computing device capable of reading computer-executable instructions and/or hosting executables. Examples of testing server 202 include, without limitation, application servers, storage servers, database servers, web servers, and/or any other suitable computing device configured to run certain software applications and/or provide various testing, web, storage, and/or database services.

In at least one example, testing server 202 may be a computing device programmed with one or more of modules 102. All or a portion of the functionality of modules 102 may be performed by testing server 202 and/or any other suitable computing system. As will be described in greater detail below, one or more of modules 102 from FIG. 1 may, when executed by at least one processor of testing server 202, enable testing server 202 to improve comparative performance test results of one or more mobile applications.

Mobile computing device 204 generally represents any type or form of mobile computing device capable of reading computer-executable instructions. In at least one embodiment, mobile computing device 204 may accept one or more directions from testing server 202. Examples of mobile computing device 204 include, without limitation, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device. In at least some embodiments, mobile computing device 204 may include at least one CPU and at least one GPU.

As shown in FIG. 2, testing server 202 and mobile computing device 204 may be communicatively coupled to one another. In some embodiments, testing server 202 and mobile computing device 204 may be communicatively coupled by way of a physical connection. For example, testing server 202 and mobile computing device 204 may be physically connected by way of a Universal Serial Bus (USB) interface, a serial connection, one or more proprietary connections (e.g., an APPLE LIGHTENING connection), and the like. In at least one example, testing server 202 and mobile computing device 204 may be communicatively coupled by way of a wireless connection (e.g., WIFI, BLUETOOTH, and so forth). Additionally or alternatively, testing server 202 and mobile computing device 204 may be communicatively coupled by way of one or more networks, such as network 206.

Network 206 generally represents any medium or architecture capable of facilitating communication and/or data transfer between testing server 202 and network server 208. Examples of network 206 include, without limitation, an intranet, a WAN, a LAN, a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, etc.), and the like. Network 206 may facilitate communication or data transfer using wireless or wired connections. In one embodiment, network 206 may facilitate communication between testing server 202 and network server 208.

Network server 208 generally represents any type or form of computing device capable of reading computer-executable instructions and/or hosting executables and communicating with testing server 202 via network 206. In at least one embodiment, mobile computing device 204 may accept one or more directions from testing server 202. Examples of network server 208 include, without limitation, application servers, storage servers, database servers, web servers, and/or any other suitable computing device configured to run certain software applications and/or provide various testing, web, storage, and/or database services.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, floppy disks, and so forth), optical-storage media (e.g., Compact Disks (CDs), Digital Video Disks (DVDs), BLU-RAY disks, and so forth), electronic-storage media (e.g., solid-state drives, FLASH media, and so forth), and other distribution systems.

Figure 3:
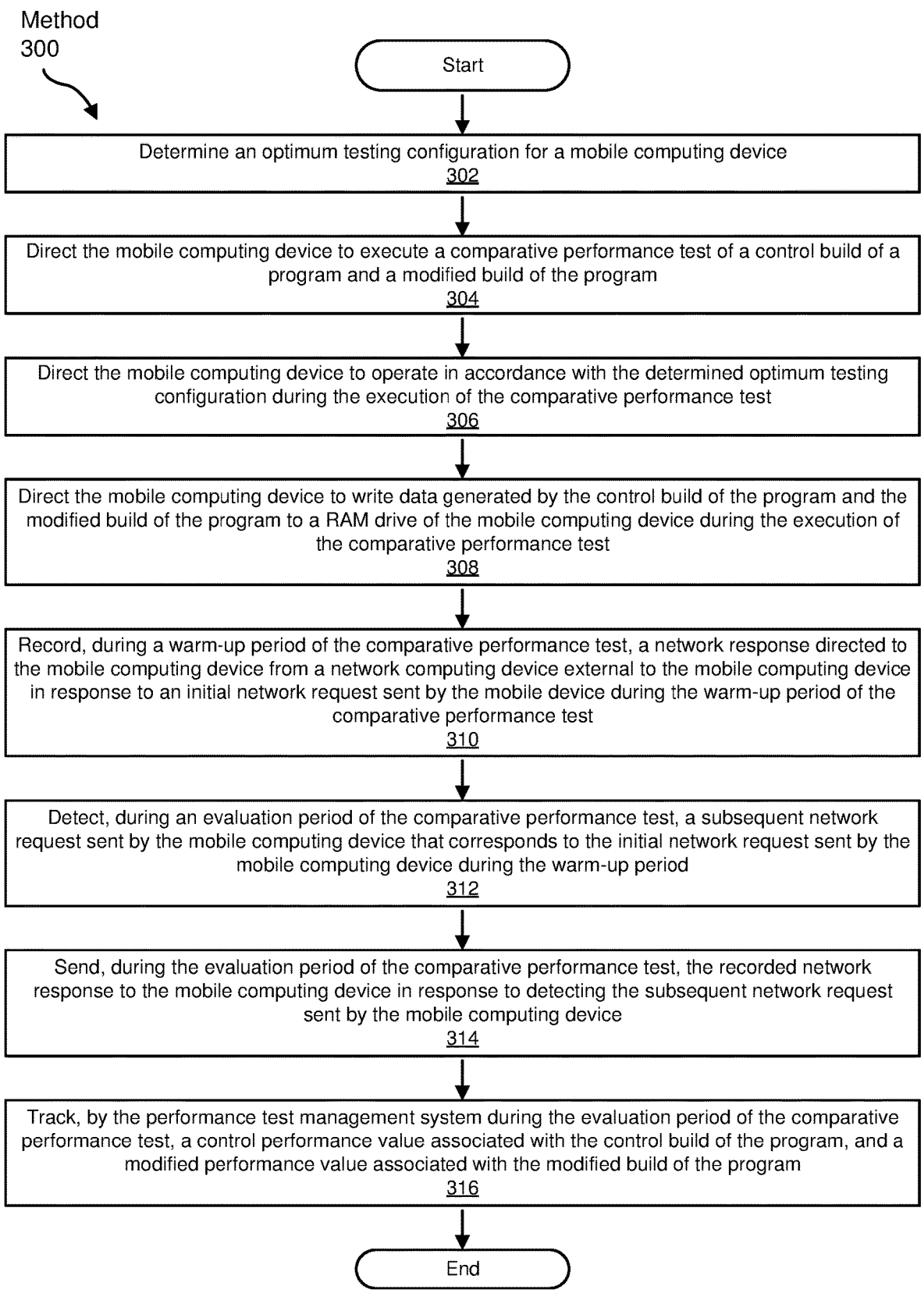
FIG. 3 is a flow diagram of an exemplary method for improving comparative performance test results of mobile applications.

FIG. 3 is a flow diagram of an example computer-implemented method 300 for improving comparative performance test results of mobile applications. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may determine an optimum testing configuration for a mobile computing device. For example, determining module 104 may, as part of testing server 202 in FIG. 2, determine an optimum testing configuration for mobile computing device 204.

The term "optimum testing configuration," as used herein, generally refers to any suitable configuration of a mobile computing device in which, when the mobile computing device is utilized to execute a comparative performance test, one or more features of the mobile computing device that may cause an inconsistent result in the comparative performance test are prevented from engaging during the comparative performance test. Such features may include, but are not limited to, a thermal throttling feature of the mobile computing device, a feature of an operating system associated with the mobile computing device, a feature of a program configured to be executed by the mobile computing device, a gyroscope sensor of the mobile computing device, a global positioning system sensor of the mobile computing device, an accelerometer of the mobile computing device, a proximity sensor of the mobile computing device, a barometer of the mobile computing device, a network interface of the mobile computing device, or a security sensor of the mobile computing device. In at least some embodiments, an optimum testing configuration may include a specified CPU clock speed and a specified GPU clock speed such that, when the mobile computing device executes a comparative performance test and the CPU operates at the specified CPU clock speed and a GPU of the mobile computing device operates at the specified GPU clock speed, a thermal throttling feature of the mobile computing device is not engaged during the comparative performance test.

The term "comparative performance test," as used herein, generally refers to a comparative evaluation of a performance characteristic associated with at least two different builds of a computer program. The term "build," as used herein, generally refers to a specific version of a computer program. The term "control build," as used herein, generally refers to a specific version of the computer program that is to be compared (e.g., as part of a comparative performance test) with another version of the computer program. The term "modified build," as used herein, generally refers to a version of the computer program that includes at least one modification relative to the control build. Hence, in at least one embodiment, directing module 106 may direct the mobile computing device to execute a comparative performance test of a control build of a program and a modified build of the program to evaluate a modification to the program (i.e., source code associated with the program) that is absent in the control build, but is included in the modified build.

Determining module 104 may determine the optimum testing configuration for mobile computing device 204 in a variety of ways and/or contexts. For example, determining module 104 may direct mobile computing device 204 to execute a preliminary execution of a comparative performance test. During the preliminary execution of the comparative performance test, determining module 104 may monitor whether mobile computing device 204 enables and/or disables one or more features of mobile computing device 204 that may cause an inconsistent result in a later execution of the comparative performance test. Based on this information, determining module 104 may determine an optimum testing configuration for mobile computing device 204.

Figure 4:
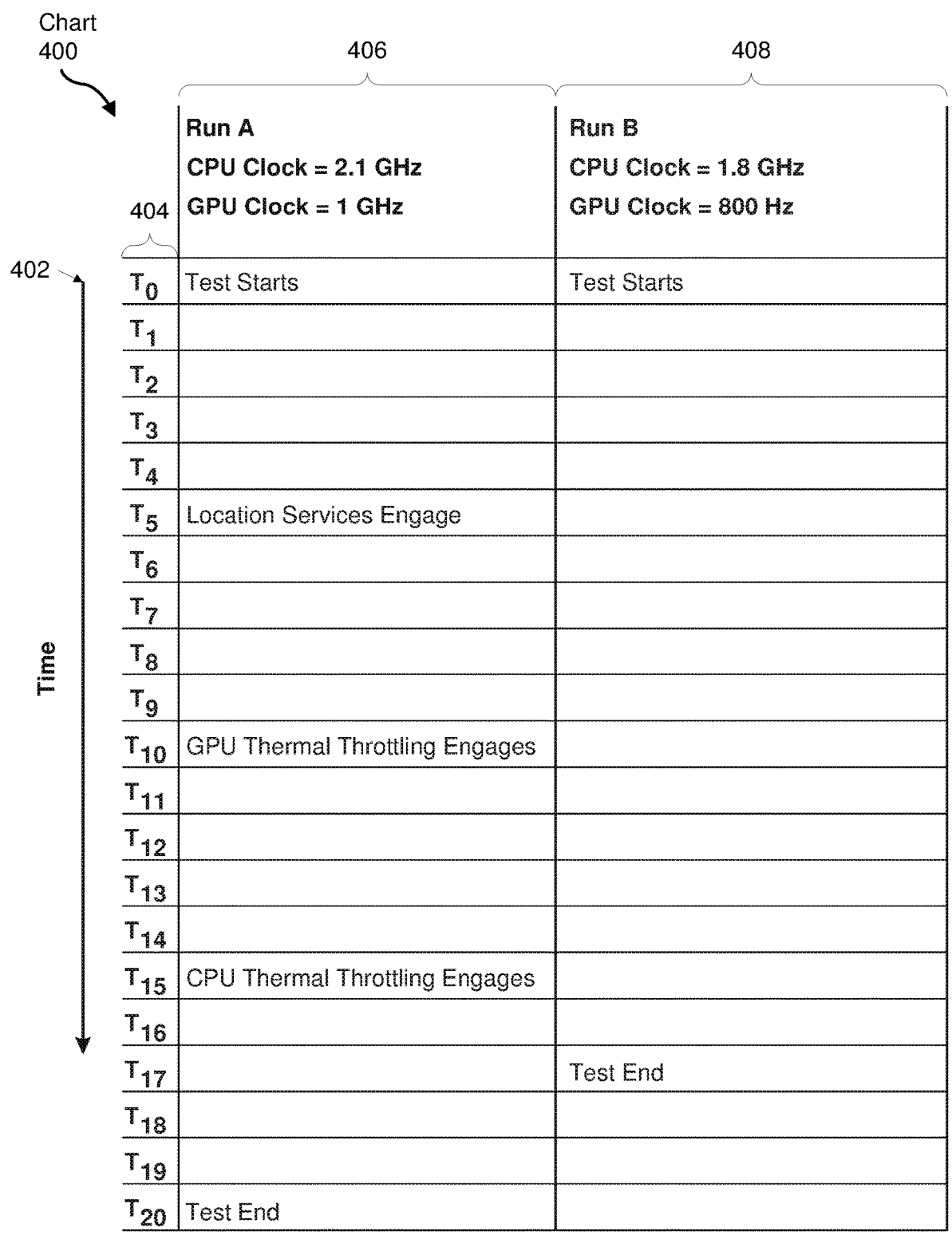
FIGS. 4-6 illustrate improving comparative performance test results of mobile applications by determining an optimum testing configuration for a mobile computing device and directing the mobile computing device to operate in accordance with the determined optimum testing configuration during an execution of a comparative performance test.

FIG. 4 illustrates an exemplary improvement of comparative performance test results of mobile applications by determining an optimum testing configuration for a mobile computing device and directing a mobile computing device to operate in accordance with a determined optimum testing configuration during an execution of a comparative performance test in accordance with the disclosed systems and methods. As shown, FIG. 4 includes a chart 400, a time axis 402, a relative time column 404, an event log 406, and an event log 408. Chart 400 of FIG. 4 shows a side-by-side comparison of a pair of executions of a comparative performance test in accordance with time scale 402. Relative time column 404 indicates relative times of events recorded in event logs 406 and 408.

Event log 406 represents a preliminary execution of a comparative performance test (Run A) by mobile computing device 204. During Run A, determining module 104 may monitor mobile computing device 204 to determine whether and/or when mobile computing device 204 engages and/or disengages various features. Event log 406 indicates that, during Run A, a CPU of mobile computing device 204 may operate at a CPU clock frequency of 2.1 GHz, while a GPU of mobile computing device 204 may operate at a GPU clock frequency of 1 GHz. Run A may begin at time $T_0$. At time $T_5$, mobile computing device 204 may engage a location services feature. At time $T_{10}$, mobile computing device 204 may engage a CPU thermal throttling feature. At time $T_{15}$, mobile computing device 204 may engage a GPU thermal throttling feature. Run A may conclude at time $T_{20}$.

These results may indicate that mobile computing device 204 is configured to activate one or more features (e.g., a thermal throttling feature, a location services feature, and so forth) during execution of a comparative performance test. For example, execution of Run A (e.g., operations performed by mobile computing device 204 in connection with the comparative performance test) may cause a temperature of a CPU of mobile computing device 204 to rise, which may, in turn, may cause mobile computing device 204 to engage a CPU throttling feature at time $T_{15}$ to reduce a clock speed of the CPU. As another example, mobile computing device 204 may be configured to activate a location services feature periodically to determine whether to update a time zone associated with a clock program. This period may elapse during Run A at time $T_5$, causing mobile computing device 204 to engage the location services feature.

Engaging of such features (e.g., a thermal throttling feature, a location services feature, etc.) during execution of the comparative performance test may cause inconsistent test results, as it may be difficult to determine (1) when the mobile computing device may engage such features, and/or (2) what effect these features might have on mobile computing device 204 during the execution of the comparative performance test. A feature unrelated to the comparative performance test may inconsistently consume resources of mobile computing device 204 that might otherwise be allocated to the comparative performance test. More consistent test results may be achieved by avoiding activation of such features, such as by disabling the features or configuring the mobile computing device such that the features are not engaged during an execution of a comparative performance test.

Figure 5:
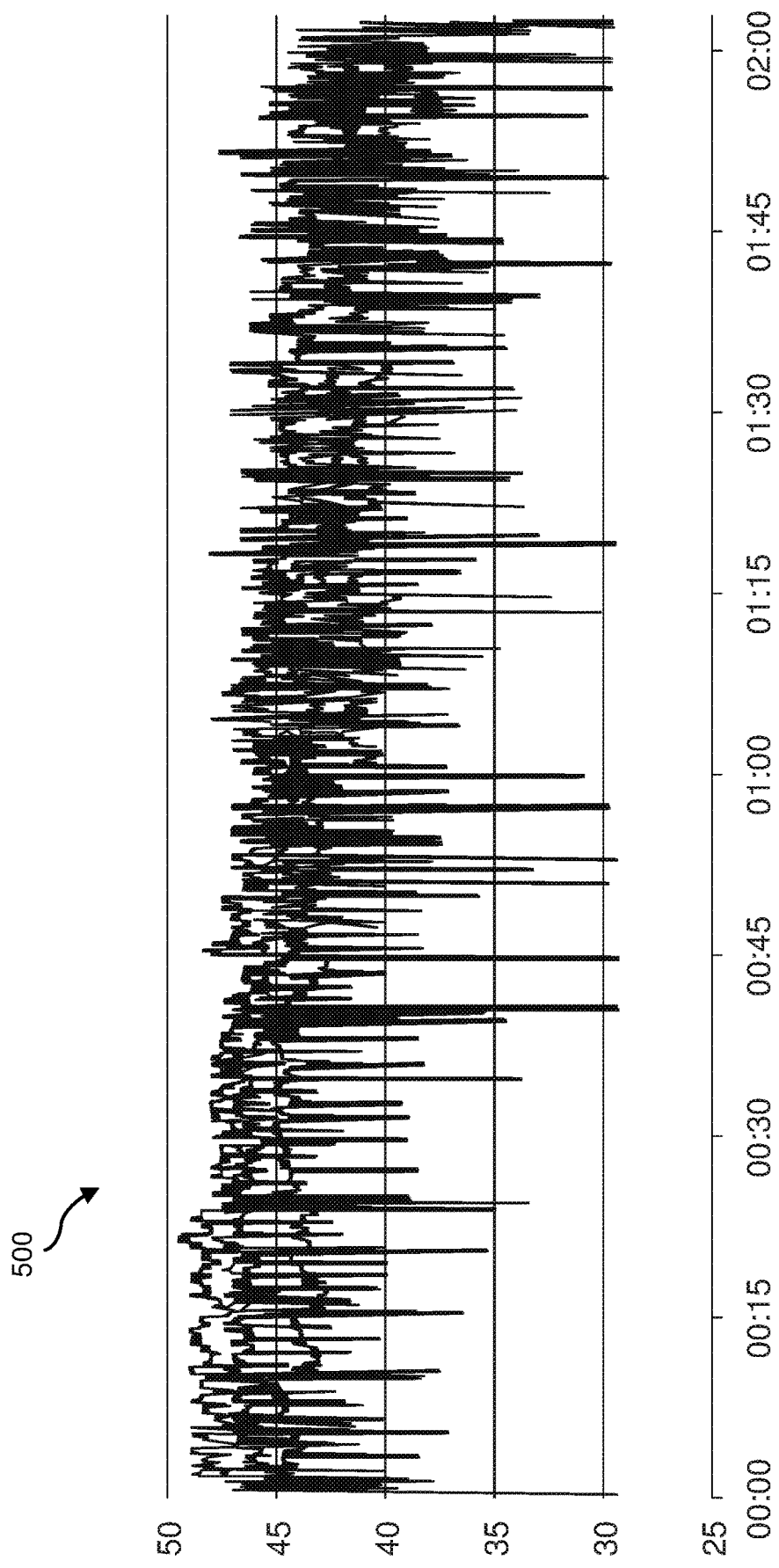

By way of illustration, FIG. 5 shows a graph 500 illustrating performance of a mobile computing device during an execution of a comparative performance test while the mobile computing device is not operating in accordance with an optimum testing configuration. As is apparent from graph 500, performance of an unoptimized mobile computing device during a comparative performance test may be inconsistent and/or difficult to predict.

Returning to FIG. 4, based on the information gathered during Run A, determining module 104 may determine an optimum testing configuration for mobile computing device 204 that may prevent inconsistent results in future executions of the comparative performance test. For example, determining module 104 may determine an optimum testing configuration for mobile computing device 204 that includes a CPU clock speed and/or a GPU clock speed that may prevent the CPU and/or GPU thermal throttling feature from engaging during the comparative performance test. Additionally or alternatively, determining module 104 may determine an optimum testing configuration for mobile computing device 204 that directs mobile computing device 204 to enable and/or disable one or more features of mobile computing device 204 that may cause an inconsistent result in a comparative performance test, including, but not limited to (1) a feature of an operating system associated with the mobile computing device, (2) a feature of a program configured to be executed by the mobile computing device, (3) a gyroscope sensor, (4) a global positioning system sensor, (5) an accelerometer, (6) a proximity sensor, (7) a barometer, (8) a network interface, and/or (9) a security sensor.

Event log 408 represents events that may occur during a subsequent execution of the comparative performance test (Run B) by mobile computing device 204 while mobile computing device 204 operates in accordance with an optimum testing configuration as determined by determining module 104. Event log 408 indicates that, during Run B, the CPU of mobile computing device 204 may operate at a CPU clock frequency of 1.8 GHz, while the GPU of mobile computing device 204 may operate at a GPU clock frequency of 800 Hz. Although not expressly shown in event log 408, it may be understood that a location services feature of mobile computing device 204 may be disabled prior to the execution of Run B.

As shown in event log 408, Run B may begin at time $T_0$ and conclude at time $T_{17}$, with no intervening events occurring during the run. As opposed to Run A, no features of mobile computing device 204 that may have caused an inconsistent result in the comparative performance test (e.g., a thermal throttling feature of mobile computing device 204, a location services feature of mobile computing device 204, and so forth) are engaged during Run B.

Figure 6:
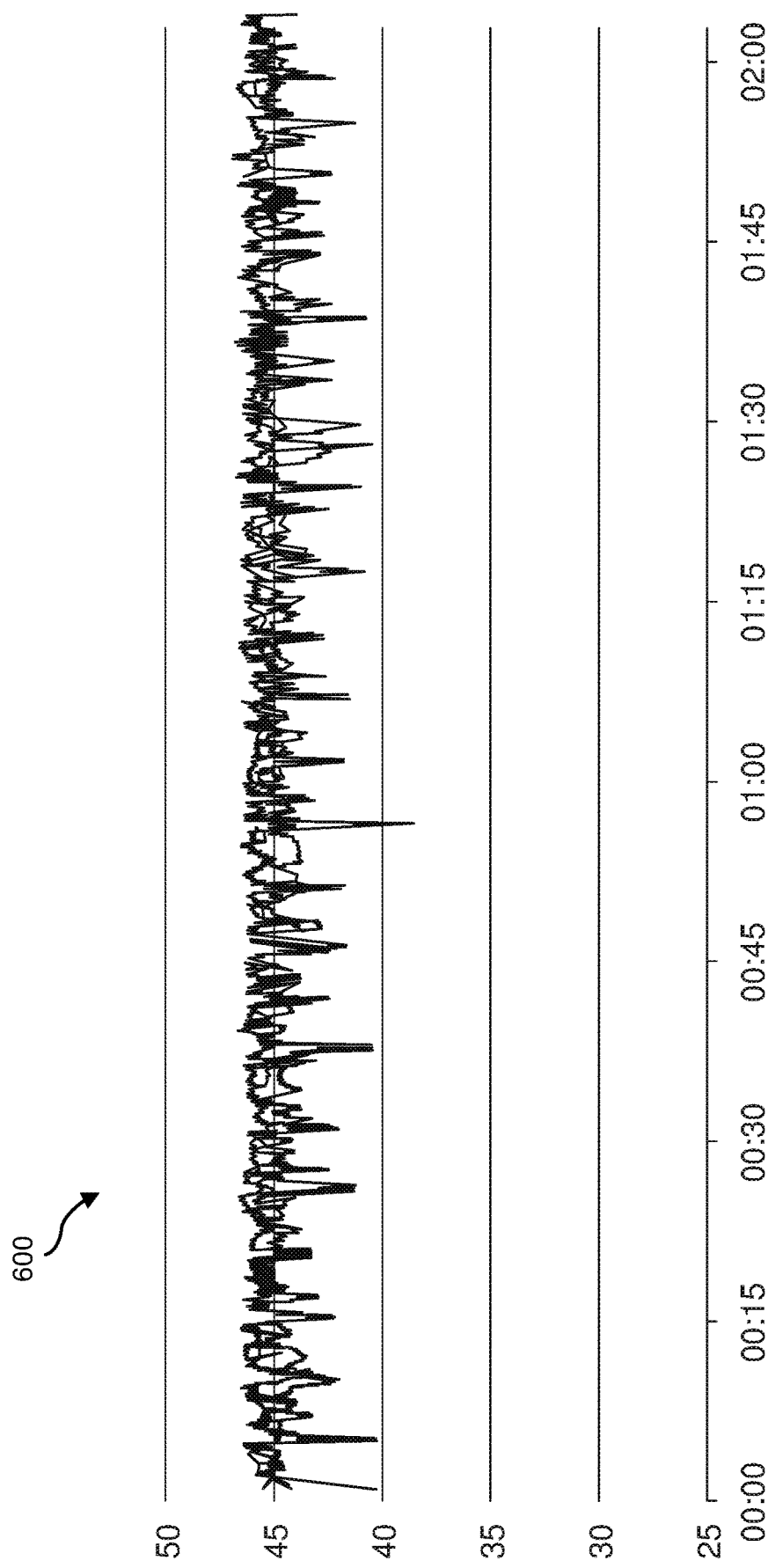

Determining an optimum testing configuration for mobile computing device 204 may lead to improved consistency in test results when mobile computing device 204 executes a comparative performance test while operating in accordance with the determined optimum testing configuration. By way of illustration, FIG. 6 shows a chart 600 of performance of a mobile computing device during an execution of a comparative performance test while the mobile computing device is operating in accordance with an optimum testing configuration. As is apparent from chart 600, performance of a mobile computing device that operates in accordance with an optimum test configuration during a comparative performance test may be more consistent and/or easier to predict than performance of a mobile computing device not operating in accordance with an optimum testing configuration during a comparative performance test.

Returning to FIG. 3, at step 304, one or more of the systems described herein may direct the mobile computing device to execute a comparative performance test of a control build of a program and a modified build of the program. For example, directing module 106 may, as part of testing server 202 in FIG. 2, direct mobile computing device 204 to execute a comparative performance test of a control build of a program and a modified build of the program.

Directing module 106 may direct mobile computing device 204 to execute the comparative performance test of the control build of the program and the modified build of the program in a variety of contexts. For example, directing module 106 may set mobile computing device 204 to a starting data state associated with the comparative performance test.

As used herein, a "starting data state" may include any data that mobile computing device 204 may utilize during an execution of the comparative performance test. Additionally or alternatively, a starting data state may exclude any data that mobile computing device 204 may not utilize during an execution of the comparative performance test.

Subsequent to setting mobile computing device 204 to a starting data state associated with the comparative performance test, directing module 106 may then direct mobile computing device 204 to execute, at least once, a set of test operations using the control build of the program, and a set of test operations using the modified build of the program. As described above, a comparative performance test may include a set of test operations intended to test a build of a program in some way. The comparative performance test may direct mobile computing device 204 to execute the set of operations at least once using a control build of the program and at least once using a modified build of the program.

After each execution of the set of test operations, directing module 106 may reset the mobile computing device to the starting data state. An execution of a set of test operations of a comparative performance test may result in one or more data items being written to a data storage device associated with mobile computing device 204. For example, if one or more of the set of test operations directs mobile computing device 204 to access an Internet site using a browser associated with mobile computing device 204, the browser may cache data associated with the accessed internet site in a data storage facility (e.g., a memory location, a physical storage device, a virtual RAM disk, and so forth) associated with mobile computing device 204. That cached data may unpredictably interfere with another execution of the set of test operations, and potentially cause inconsistent results in the comparative performance test.

To minimize any inconsistency that may be introduced into the comparative performance test by the presence of data (e.g., cached data and the like) written to a data storage facility associated with mobile computing device 204 during a previous execution of a set of test operations, directing module 106 may set mobile computing device 204 to a starting data state before and/or after each execution of the set of test operations. This may ensure that each execution of the set of test operations (e.g., each "run" of the set of test operations included in the comparative performance test) is performed in an identical data environment to the previous execution of the set of test operations.

Directing module 106 may set mobile computing device 204 to a starting data state in any suitable way. For example, directing module 106 may replace contents of a physical data storage device (e.g., a physical drive, such as a HDD, SSD, FLASH memory, and so forth) associated with mobile computing device 204 with a preconfigured disk image, and/or may erase any data stored in a RAM device associated with mobile computing device 204. As another example, directing module 106 may configure a physical data storage device and/or a RAM device associated with mobile computing device 204 in accordance with one or more comparative performance test definition files (e.g., test definition 228) before and/or after each execution of the set of test operations.

Figure 7:
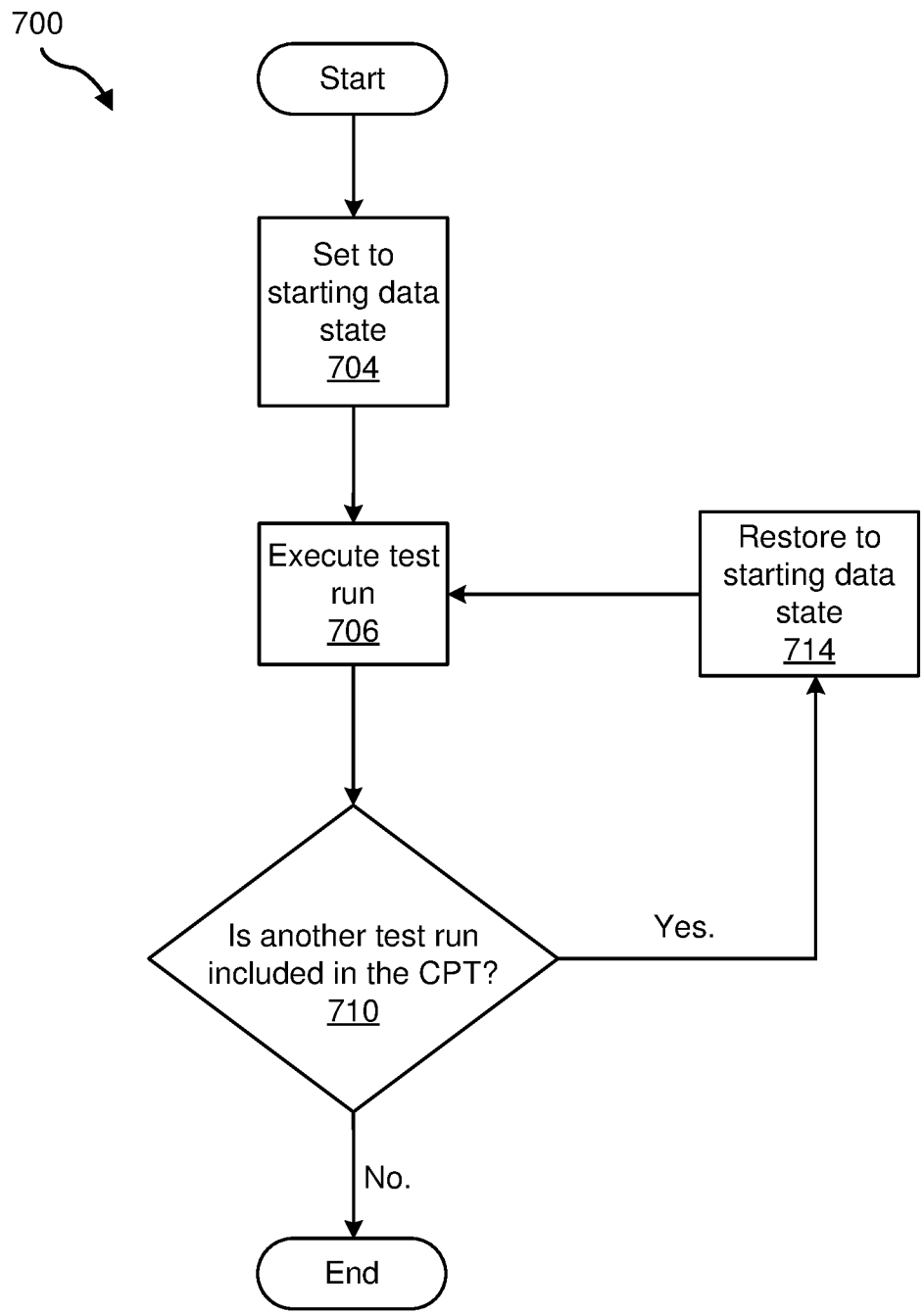
FIG. 7 illustrates an exemplary operational flow for improving comparative performance test results of mobile applications by resetting, after each execution of a set of test operations using a build of the program, the mobile computing device to a starting data state.

FIG. 7 illustrates an exemplary operational flow 700 for improving comparative performance test results of mobile applications. At step 704, directing module 106 may, as part of testing server 202 in FIG. 2, set mobile computing device 204 to a starting data state. At step 706, directing module 106 may direct mobile computing device 204 to execute a set of test operations (i.e., a "test run") using a build of a program. At decision 710, directing module 106 may determine whether another test run is included in the comparative performance test (CPT). If no, the operational flow may end. If yes, directing module may restore mobile computing device 204 to the starting data state at step 714. After restoring the mobile computing device to the starting data state, directing module 106 may execute another test run at step 706.

Returning to FIG. 3, at step 306, one or more of the systems described herein may direct the mobile computing device to operate in accordance with the determined optimum testing configuration during the execution of the comparative performance test. For example, directing module 106 may, as part of testing server 202 in FIG. 2, direct mobile computing device 204 to operate in accordance with the determined optimum testing configuration during the execution of the comparative performance test.

Directing module 106 may direct mobile computing device 204 to operate in accordance with the determined optimum testing configuration during the execution of the comparative performance test in a variety of contexts. For example, directing module 106 may direct mobile computing device 204 to operate at a specified CPU clock speed and/or GPU clock speed in accordance with the determined optimum testing configuration. Additionally or alternatively, directing module 106 may direct mobile computing device 204 to enable and/or disable a feature of mobile computing device 204 in accordance with the determined optimum testing configuration. Hence, mobile computing device 204 may operate in a consistent and/or predictable manner during the execution of the comparative performance test, which may improve comparative performance test results of mobile applications when the comparative performance test is executed by way of mobile computing device 204.

Returning to FIG. 3, at step 308, one or more of the systems described herein may direct the mobile computing device to write data generated by the control build of the program and the modified build of the program to a RAM drive of the mobile computing device during the execution of the comparative performance test. For example, directing module 106 may, as part of testing server 202 in FIG. 2, direct mobile computing device 204 to write data generated by the control build of the program and the modified build of the program to a RAM drive (e.g., a virtual RAM drive) of mobile computing device 204 during the execution of the comparative performance test.

As RAM may be written to much more quickly than other data storage mediums (e.g., hard disk drives, solid state drives, FLASH memory, and so forth), directing mobile computing device 204 to write data only to a RAM disk during a comparative performance test may serve to eliminate inconsistent write times (e.g., time for mobile computing device 204 to write to a physical storage medium) as a factor in comparative performance test results.

As used herein, a "RAM drive" or "virtual RAM drive" may be a block of volatile memory (e.g., RAM, DRAM, and so forth) that a mobile computing device may utilize as if the block of volatile memory were a physical disk drive.

Directing module 106 may direct mobile computing device 204 to direct mobile computing device 204 to write data generated by the control build of the program and the modified build of the program to a RAM drive of mobile computing device 204 during the execution of the comparative performance test in a variety of ways. For example, in some embodiments, directing module 106 may direct mobile computing device 204 to designate a portion of a physical memory of mobile computing device 204 as a virtual RAM drive prior to directing mobile computing device 204 to write data generated during the execution of the comparative performance test to the virtual RAM drive. Directing module 106 may then direct mobile computing device 204 to utilize the virtual RAM drive instead of another storage medium associated with mobile computing device 204 (e.g., a physical drive) during the comparative performance test.

In some embodiments, directing module 106 may actively prevent mobile computing device 204 from writing data generated during the comparative performance test to a physical drive during execution of the comparative performance test. Directing module 106 may prevent mobile computing device 204 from writing data generated during the comparative performance test to a physical drive during execution of the comparative performance test in any suitable way. For example, directing module 106 may direct an operating system associated with mobile computing device 204 to unmount a physical drive of the mobile computing device 204 prior to execution of the comparative performance test. Additionally or alternatively, directing module 106 may intercept one or more write commands from the operating system associated with mobile computing device 204 during the comparative performance test and redirect those write commands to the RAM disk, thereby both directing mobile computing device 204 to write data associated with those write commands to the RAM disk, and preventing mobile computing device 204 from writing the data to a physical drive.

Figure 8:
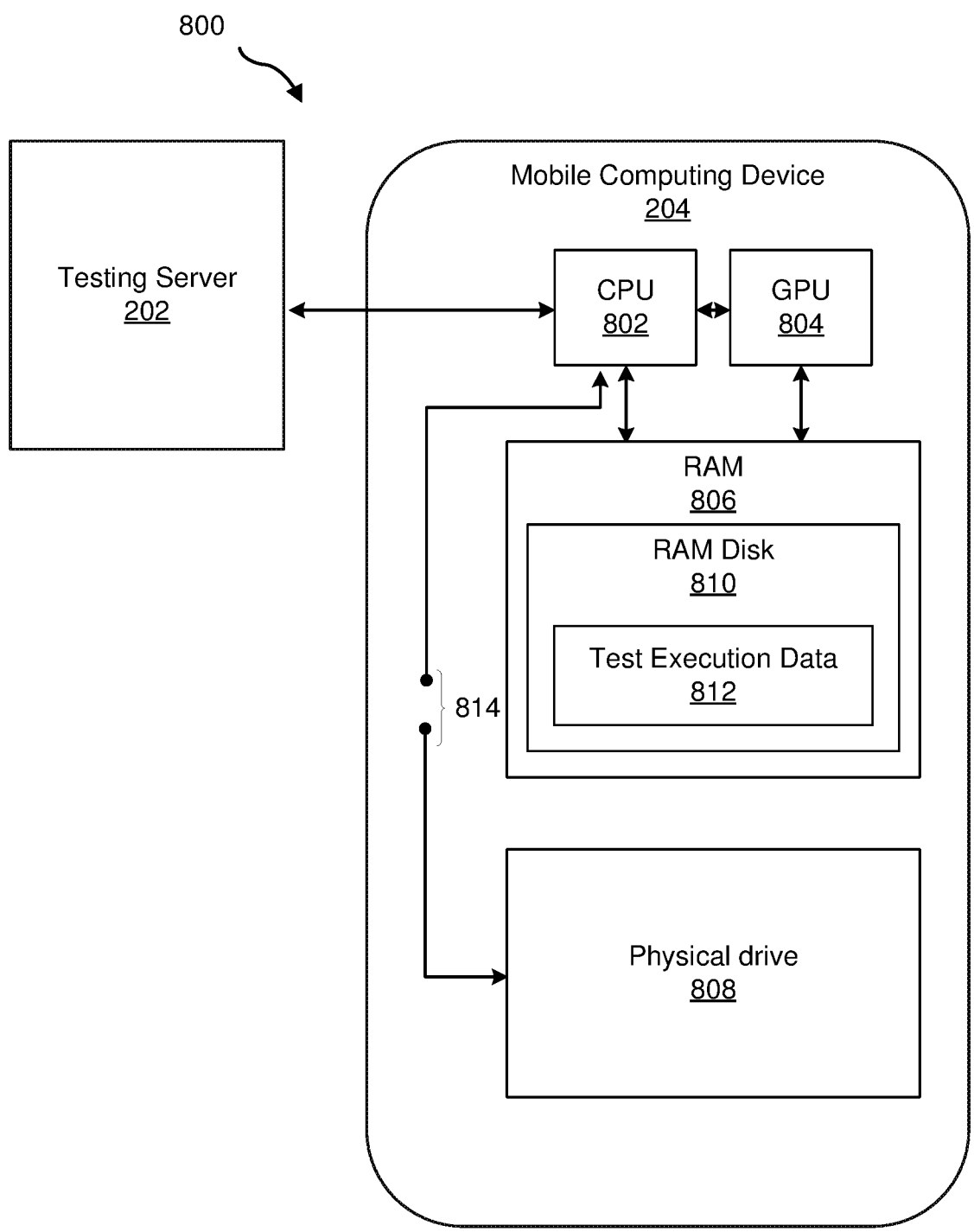
FIG. 8 illustrates an exemplary system for improving comparative performance test results of mobile applications directing a mobile computing device to write data to a RAM drive of the mobile computing device during the execution of the comparative performance test.

FIG. 8 illustrates an exemplary system 800 for improving comparative performance test results of mobile applications by directing the mobile computing device to write data to the RAM drive of the mobile computing device during the execution of the comparative performance test. As shown in FIG. 8, testing server 202 may be in communication with mobile computing device 204 by way of a CPU 802 included in mobile computing device 204. Mobile computing device 204 may also includes a GPU 804, RAM 806, and a physical drive 808. Physical drive 808 may be any suitable physical data storage medium including, but not limited to, a HDD, a SSD, a FLASH memory device, and so forth. As shown, testing server 202 may direct mobile computing device 204 to designate a block of RAM 806 as RAM disk 810 (e.g., a RAM drive or virtual RAM drive), and direct mobile computing device 204 to write test execution data 812 to RAM disk 810. Disjunction 814 illustrates a state in which physical drive 808 is not in communication with CPU 802 (e.g., during execution of the comparative performance test). For example, testing server 202 may direct mobile computing device 204 to unmount physical drive 808, thereby preventing mobile computing device 204 from writing data to physical drive 808 during the execution of the comparative performance test.

In some embodiments, another source of inconsistency in comparative performance test results for mobile applications may be related to communication by the mobile computing device with one or more network devices by way of a network during the comparative performance test. For example, during a comparative performance test, mobile computing device 204 may attempt to communicate with network server 208. Various factors including, but not limited to, network latency, usage of computing resources of mobile computing device 204 and/or network server 208, and so forth, may cause inconsistency in a time of communication between mobile computing device 204 and network server 208 by way of network 206. System 100 may perform one or more operations by way of one or more modules 102 to minimize and/or remove inconsistency in comparative performance test results related to network communications.

Returning to FIG. 3, at step 310, one or more of the systems described herein may record a network response directed to the mobile computing device from a network computing device external to the mobile computing device in response to an initial network request sent by the mobile computing device during the warm-up period of the comparative performance test. For example, recording module 108 may, as part of testing server 202 in FIG. 2, record network response 214 directed to mobile computing device 204 from network server 208 in response to initial network request 216 sent by mobile computing device 204 during the warm-up period of the comparative performance test.

As used herein, a "network request" may be any communication sent from a first computing device (e.g., mobile computing device 204) to a second computing device (e.g., network server 208) by way of a suitable telecommunications network (e.g., network 206) intended to cause the second computing device to transmit data (e.g., network response 214) to the first device. As used herein, a "network response" may be any communication from the second computing device sent to the first computing device in response to a network request sent to the second device by the first computing device.

Network requests and network responses may include any suitable data, in any suitable format. Examples of suitable formats for network requests and/or network responses may include, but are not limited to, HyperText Markup Language (HTML) Extensible Markup Language (XML) data objects, JavaScript Object Notation (JSON) data objects, GRAPHQL queries, Structured Query Language (SQL) queries, and so forth.

Recording module 108 may record network response 214 directed to mobile computing device 204 from network server 208 in a variety of different ways. For example, recording module 108 may intercept an initial network request from mobile computing device 204 during the warm-up period of a comparative performance test, record the initial network request (e.g., as initial network request 216 in request data 212), and pass the network request to network server 208. Recording module may then intercept a network response from network server 208 addressed to mobile computing device 204, record the network response (e.g., as network response 214 in response data 210), and then pass the network response to mobile computing device 204. In this way, recording module 108 may, for example, act as a proxy and/or gateway for network requests sent from mobile computing device 204 during the warm-up period and network responses addressed to mobile computing device 204 during the warm-up period.

In some embodiments, recording module 108 may associate particular network requests sent by mobile computing device 204 with recorded network responses addressed to mobile computing device 204. For example, recording module 108 may receive, from mobile computing device 204, an initial network request addressed to network server 208. Recording module 108 may record the initial network request (e.g., as initial network request 216 in request data 212) and then send it on to network server 208. Recording module 108 may then receive, from network server 208, a network response addressed to mobile computing device 204 that network server 208 sent in response to the network request, record the network response (e.g., as network response 214 in response data 210), and further record that the network response was sent by network server 208 in response to the initial network request (e.g., initial network request 216). Recording module 108 may then associate the recorded initial network request with the recorded network response.

Figure 9:
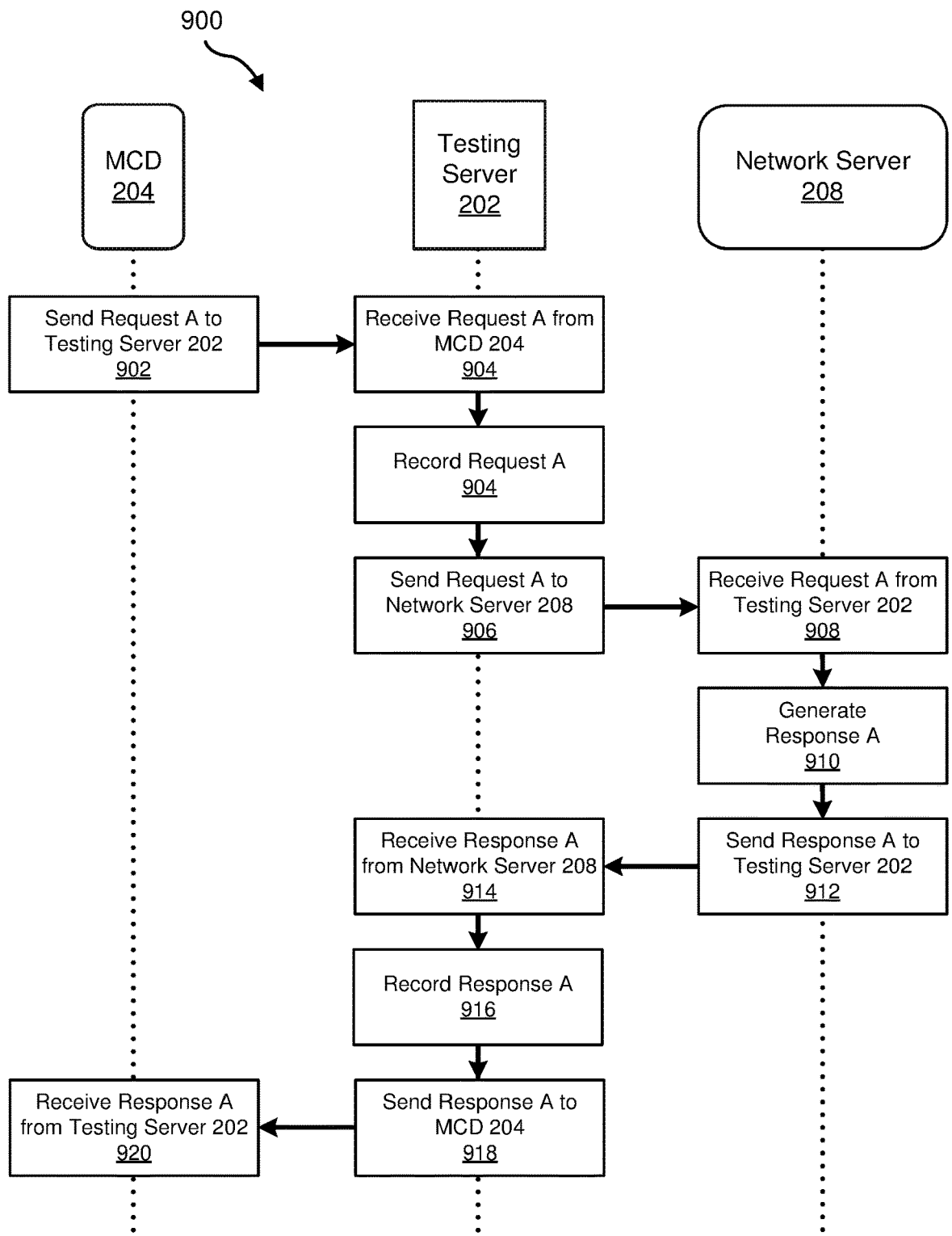
FIG. 9 illustrates an exemplary operational flow of a system for improving comparative performance test results of mobile applications recording, during a warm-up period of a comparative performance test, a network response directed to a mobile computing device.

FIG. 9 illustrates an exemplary operational flow 900 of an exemplary system for improving comparative performance test results of mobile applications by recording, during a warm-up period of a comparative performance test, a network response directed to the mobile computing device. At step 902, mobile computing device 204 (i.e., MCD 204 in FIG. 9) may send a network request (Request A) to testing server 202. Mobile computing device 204 may send Request A to testing server 202 in any suitable manner. For example, mobile computing device 204 may send request A to testing server 202 by way of a physical connection between mobile computing device 204 and testing server 202. At step 904, testing server 202 may receive Request A from mobile computing device 204. At step 904, testing server 202 may record Request A (e.g., as initial network request 216 in request data 212). Testing server 202 may record Request A to any suitable data storage location, such as to one or more storage devices included in memory 140.

At step 906, testing server 202 may send Request A to network server 208. Testing server 202 may send Request A to network server 208 in any suitable manner, such as by way of network 206. At step 908, network server 208 may receive Request A from testing server 202. At step 910, network server 208 may generate Response A. Network server 208 may generate Response A in any suitable manner. In some implementations, network server 208 may generate Response A based on Request A. For example, Request A may include a request for a specific set of data from network server 208. Network server 208 may then generate Response A that includes the requested specific set of data.

At step 912, network server 208 may send Response A to testing server 202. Network server 208 may send Response A to testing server 202 in any suitable manner. In at least one example, network server 208 may send Response A to testing server 202 via network 206. At step 914, testing server 202 receives Response A from network server 208. At step 916, testing server 202 may record Response A (e.g., as network response 214 in response data 210). As with Request A in step 904, testing server 202 may record Response A in any suitable manner and to any suitable data storage location, such as to one or more storage devices included in memory 140. As described above, testing server 202 may additionally associate Response A and Request A in any suitable manner.

At step 918, testing server 202 may send Response A to mobile computing device 204. Testing server 202 may send Response A to mobile computing device 204 in any suitable manner. For example, testing server 202 may send Response A to mobile computing device 204 via a physical connection between testing server 202 and mobile computing device 204. At step 920, mobile computing device 204 may receive Response A from testing server 202.

By recording network responses received in response to network requests during the warm-up period of the comparative performance test, recording module 108 may build a set of network request-network response pairs specific to operations that mobile computing device 204 may execute during a comparative performance test. This set of network request-network response pairs may be utilized (e.g., accessed directly from testing server 202 instead of network server 208) by one or more modules 102 during a subsequent evaluation period of the comparative performance test to isolate testing server 202 and mobile computing device 204 from network 206 and/or network server 208 during the subsequent evaluation period of the comparative performance test. This isolation of the testing server 202 and mobile computing device 204 during the subsequent evaluation period of the comparative performance test may, in turn, serve to further improve comparative performance test results of mobile applications.

Returning to FIG. 3, at step 312, one or more of the systems described herein may detect, during an evaluation period of a comparative performance test, a subsequent network request sent by the mobile computing device that corresponds to the initial network request sent by the mobile computing device during the warm-up period. For example, detecting module 110 may, as part of testing server 202 in FIG. 2, detect, during an evaluation period of the comparative performance test, a subsequent network request 218 sent by mobile computing device 204 that corresponds to initial network request 216 sent by mobile computing device 204 during the warm-up period.

Detecting module 110 may detect subsequent network request 218 sent by mobile computing device 204 in a variety of contexts. For example, detecting module 110 may be configured to receive all network requests sent from mobile computing device 204 during the evaluation period of the comparative performance test. Detecting module 110 may be configured to examine a received network request and determine whether the received network request corresponds to a network request sent by the mobile computing device 204 during the warm-up period. Detecting module 110 may utilize any suitable data set to make this determination, including, but not limited to, a set of network request-network response pairs generated by one or more modules 102 (e.g., recording module 108) during a warm-up period of the comparative performance test.

Returning to FIG. 3, at step 314, one or more of the systems described herein may send, during the evaluation period of the comparative performance test, the recorded network response to the mobile computing device in response to detecting the subsequent network response. For example, sending module 112 may, as part of testing server 202 in FIG. 2, send, during the evaluation period of the comparative performance test, a recorded network response 214 to mobile computing device 204 in response to detecting a subsequent network request 218 sent by mobile computing device 204.

Sending module 112 may send the recorded network response 214 to mobile computing device 204 in response to detecting subsequent network request 218 sent by mobile computing device 204 in a variety of contexts. For example, sending module 112 may send the recorded network response (e.g., network response 214) from testing server 202 to mobile computing device 204 by way of a physical connection between testing server 202 and mobile computing device 204.

Figure 10:
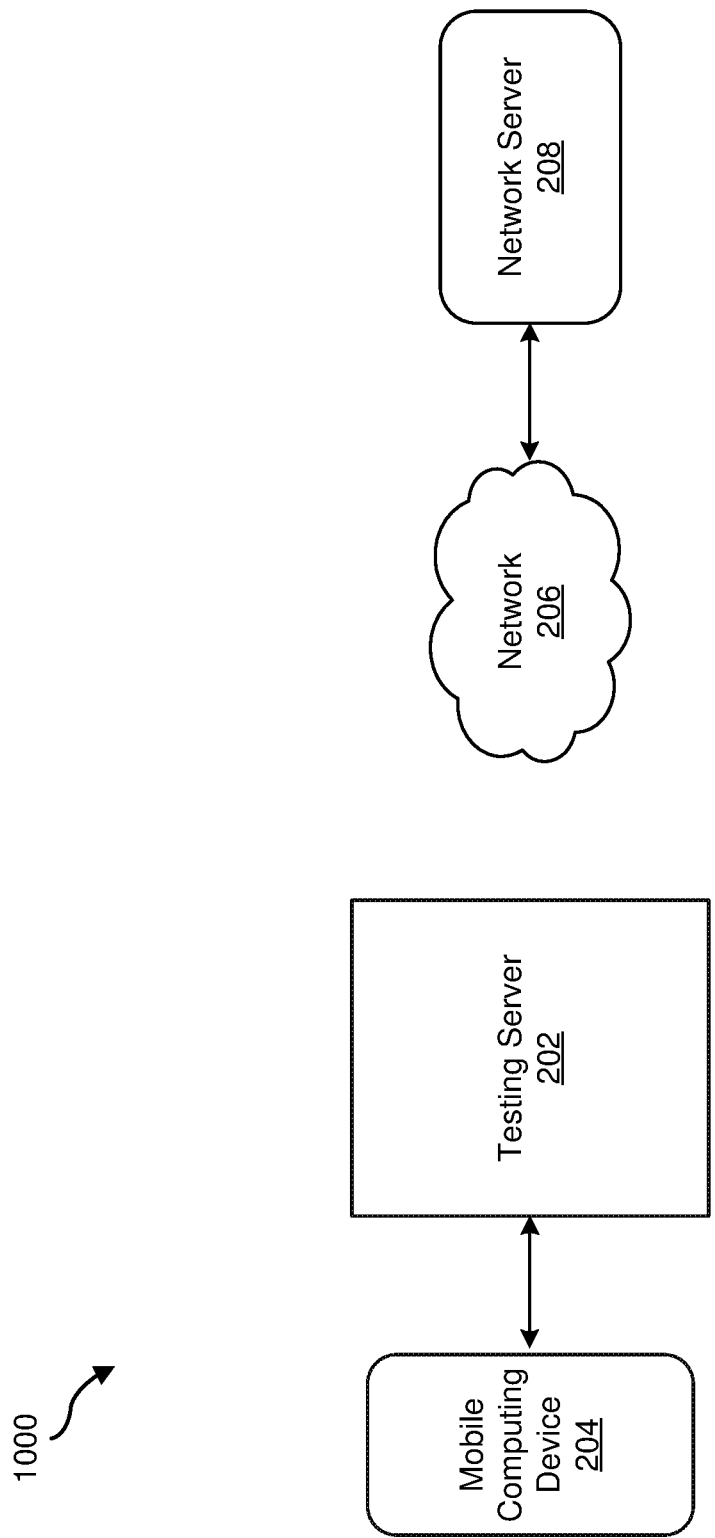
FIG. 10 illustrates an exemplary configuration in which a system for improving comparative performance test results of mobile applications may detect, during an evaluation period of a comparative performance test, a network request sent by the mobile computing device and, in response, send a recorded network response to the mobile computing device.

FIG. 10 illustrates an exemplary system configuration 1000 in which exemplary system 200 shown in FIG. 2 may detect, during an evaluation period of a comparative performance test, a network request sent by the mobile computing device and, in response, send a recorded network response to the mobile computing device. Exemplary configuration 800 may illustrate the elements of exemplary system 200 during the evaluation period of the comparative performance test.

Exemplary system configuration 1000 may include each of the components of exemplary system 200 (e.g., testing server 202, mobile computing device 204, network 206, and network server 208), with testing server 202 communicatively coupled (e.g., by way of a physical connection) to mobile computing device 204, but not communicatively coupled to network server 208 by way of network 206. In other words, a communications connection between testing server 202 and network 206 that may be present during a warm-up period of the comparative performance test may be absent during the evaluation period of the comparative performance test.

In system configuration 1000 and other similar configurations, testing server 202 and/or mobile computing device 204 may prevent mobile computing device 204 from receiving network responses from network server 208 during the evaluation period. Hence, testing server 202 and mobile computing device 204 may be communicatively isolated from other components of exemplary system 200, and any potential interference or inconsistency in test results caused by network 206 and/or network server 208 may be reduced during the evaluation period of the comparative performance test.

Figure 11:
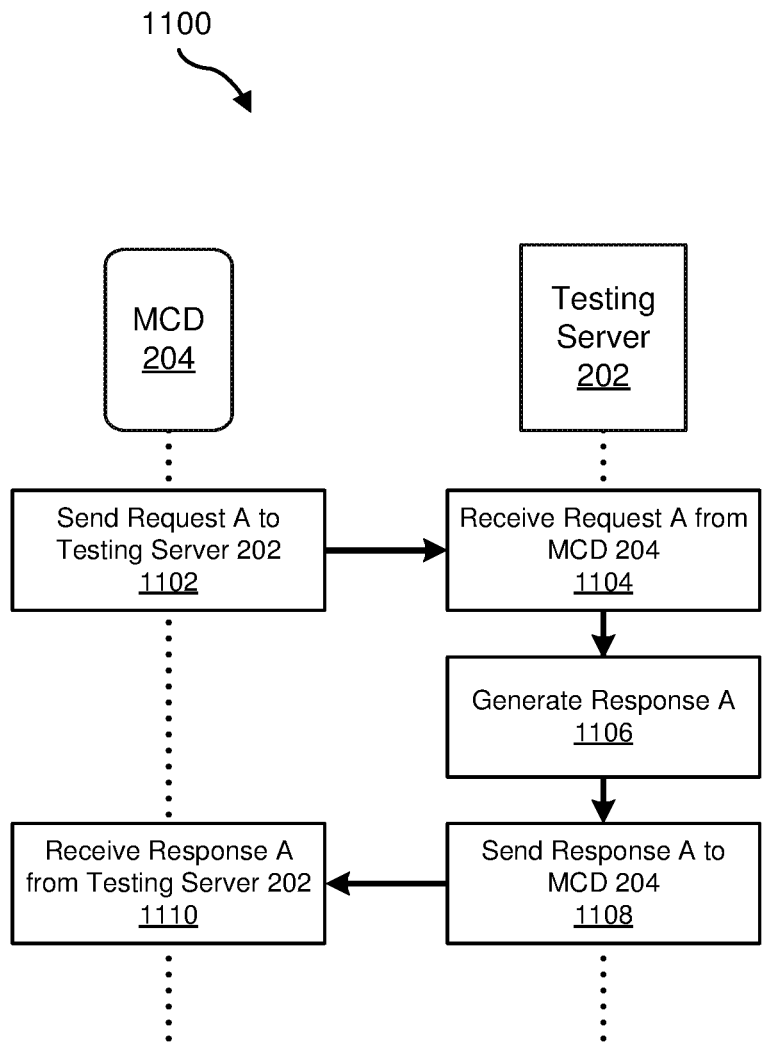
FIG. 11 illustrates an exemplary operational flow of a system for improving comparative performance test results of mobile applications detecting, during an evaluation period of a comparative performance test, a network request sent by the mobile computing device and, in response, sending a recorded network response to the mobile computing device.

FIG. 11 illustrates an exemplary operational flow 1100 of an exemplary system for improving comparative performance test results of mobile applications detecting, during an evaluation period of a comparative performance test, a network request sent by the mobile computing device and, in response, sending a recorded network response to the mobile computing device. Operational flow 1100 illustrates communications between testing server 202 and mobile computing device 204 shown in FIGS. 2 and 10. At step 1102, mobile computing device 204 (i.e., MCD 204 in FIG. 11) may send a network request (request A) to testing server 202. Mobile computing device 204 may send request A to testing server 202 in any suitable manner. For example, mobile computing device 204 may send request A to testing server 202 via a physical connection between mobile computing device 204 and testing server 202. At step 1104, testing server 202 may receive request A from mobile computing device 204.

At step 1106, testing server 202 may generate response A. Testing server 202 may generate response A in any suitable manner. For example, testing server 202 may generate response A by determining that testing server 202 also received request A from mobile computing device 204 (e.g., as initial network request 216) during the warm-up period of the comparative performance test. Testing server 202 may then identify a network response (e.g., network response 214) that testing server 202 received and recorded during the warm-up period of the comparative performance test in response to request A during the warm-up period of the comparative performance test. Testing server 202 may then generate response A by accessing data representative of the identified network response (e.g., network response 214).

At step 1108, testing server 202 may send response A to mobile computing device 204. Testing server 202 may send response A to mobile computing device 204 in any suitable manner. For example, testing server 202 may send response A to mobile computing device 204 via a physical connection between testing server 202 and mobile computing device 204. At step 1110, mobile computing device 204 may receive response A from testing server 202.

In some embodiments, one or more modules 102 may alter a network response before sending module 112 sends the network response to the mobile computing device. For example, as described above, a network response may include a response to a GRAPHQL query. That query may return, as part of the network response, data that is not necessary for evaluating the performance of the control build and the modified build in accordance with a comparative performance test. Recording module 108 may strip this unnecessary data from the network response instead of recording it. Additionally or alternatively, sending module 112 may strip such unnecessary data from the network response prior to sending the network response to mobile computing device 204. This may lead to more efficient storage of network responses and/or conservation of network resources in sending the modified network response to mobile computing device 204 rather than the original network response.

One or more modules 102 may determine whether to alter a network response before sending the network response in any suitable manner. For example, as described above, one or more modules 102 may receive a test definition file (e.g., test definition 228) associated with a comparative performance test. Test definition 228 may include one or more instructions that direct one or more modules 102 to alter a network response before sending the network response to mobile computing device 204 during an evaluation portion of the comparative performance test.

FIG. 12 illustrates exemplary GRAPHQL queries and responses that an exemplary system for improving comparative performance test results of mobile applications may receive, modify, and send. Listing 1200 in FIG. 12 includes a GRAPHQL request 1202, a JSON response 1204, and a modified JSON response 1206. GRAPHQL request 1202 may include a GRAPHQL query string that requests a set of person objects from a network resource (e.g., network server 208). Each person object may include a name and a list of names of friends of the person object. JSON response 1204 may include a JSON object that includes a single person data object with the name "Alan Fitzgerald" and a list of three "friends" with names "Bibiana Sarabina," "Charles Jones," and "Danny Chang."

Modified JSON response 1206 shows a modified version of JSON response 1204. Modified JSON response 1206 may be the same as JSON response 1204, except that the list of "friends" may be replaced with an empty list. One or more modules 102 may determine that the list of "friends" may be omitted from JSON response 1204. Therefore, one or more modules 102 may alter JSON response 1204 to generate modified JSON response 1206 by removing the list of "friends" from the JSON object included in JSON response 1204 prior to sending a network response to mobile computing device 204. This modification may lead to more efficient storage of network responses, as well as conservation of network resources in sending the modified network response (i.e., modified JSON response 1206) to mobile computing device 204 rather than the original network response (i.e., JSON response 1204).

Returning to FIG. 3, at step 316, one or more of the systems described herein may track, during the evaluation period of the comparative performance test, a control performance value associated with the control build of the program and a modified performance value associated with the modified build of the program. For example, tracking module 114 may, as part of testing server 202 in FIG. 2, track, during the evaluation period of the comparative performance test, performance data 220, including, but not limited to, control performance value 222 associated with the control build of the program and modified performance value 224 associated with the modified build of the program.

As used herein, a "performance value" may be any suitable measurement of performance of a build of a program. Examples of a performance value may include, but are not limited to, a startup time of the build, a memory usage of the build, a usage of a particular network resource by the build (e.g., a number of requests to access a particular network resource, bandwidth usage of the build during the comparative performance test, and so forth), a time to generate a particular frame in a graphical user interface associated with the build, a time to execute a predefined set of tasks by the build, a number of network requests generated by the mobile computing device while it executes the comparative performance test using the build, a size of an executable file associated with the build, a memory footprint of the build, and so forth.

Tracking module 114 may track performance values in a variety of contexts. For example, tracking module 114 may receive, from mobile computing device 204, after each execution of a set of test operations included in a comparative performance test, a performance value representative of a performance of the build of the program that executed the set of test operations. Tracking module 114 may then record the received performance value in any suitable storage location, such as one or more memory devices included in memory 140.

Tracking module 114 may track both a control performance value (e.g., control performance value 222 associated with a control build of the computer program) and a modified performance value (e.g., modified performance value 224) associated with a modified build of the computer program. By tracking the control performance value associated with the control build of the computer program and the modified build of the computer program, tracking module 114 may facilitate an A/B comparison between the control build and the modified build based on a difference between the control performance value and the modified performance value.

Figure 13:
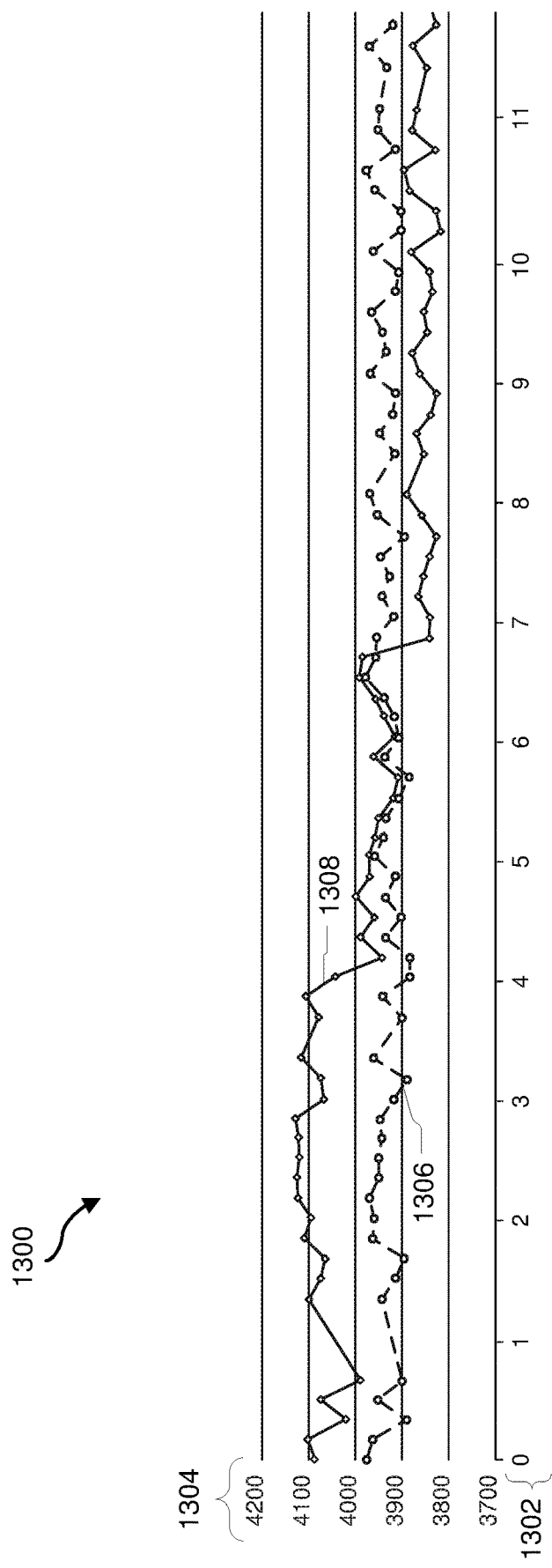
FIG. 13 illustrates exemplary performance test results tracked by a system for improving comparative performance test results of mobile applications.

FIG. 13 illustrates a chart 1300 of exemplary performance test results that an exemplary system for improving comparative performance test results of mobile applications may track in accordance with the systems and methods described herein. As shown in chart 1300, system 200 (e.g., by way of directing module 106) may execute a comparative performance test of a control build of a program and a modified build of a program and may track the results (e.g., by way of tracking module 114). Chart 1300 shows such tracked results in a graphical form. Chart 1300 includes a comparative performance test axis 1302, a performance value axis 1304, a control performance value line 1306, and a modified performance value line 1308. Comparative performance test axis 1302 may indicate each test operation included in a set of test operations included in a comparative performance test. Performance value axis 1304 may indicate performance values associated with execution of each test operation included in the set of test operations. Hence, control performance value line 1306 may indicate control performance values associated with execution of the set of test operations using the control build of the program, and modified performance value line 1308 may indicate control performance values associated with execution of the set of test operations using the modified build of the program.

In some embodiments, one or more of the systems described herein may compare a control performance value with a modified performance value, and determine that a difference between the modified build and the control build introduces a regression into the modified build based on the comparison of the control performance value with the modified performance value. For example, comparing module 116 may, as part of testing server 202 in FIG. 2, compare control performance value 222 with modified performance value 224, and determine that a difference between the modified build and the control build introduces a regression into the modified build based on the comparison of control performance value 222 with modified performance value 224.

As used herein, a "regression" may be any change introduced into a build of a program (i.e., into source code associated with the build of the program) that causes a variation in a performance value associated with the program such that the variation is outside of a predetermined threshold variation value.

Comparing module 116 may compare control performance value 222 with modified performance value 224, and determine that a difference between the modified build and the control build introduces a regression into the modified build based on the comparison of control performance value 222 with modified performance value 224, in a variety of contexts. For example, in some implementations, control performance value 222 may include a control generation time indicating a duration of time mobile computing device 204 took to generate a GUI frame using the control build, and modified performance value 224 may include a modified generation time indicating a duration of time mobile computing device 204 took to generate the GUI frame using the modified build.

Comparing module 116 may further determine that a difference between control performance value 222 and modified performance value 224 is within a predetermined threshold variation value. By way of illustration, in an example where control performance value 222 is 10 ms, modified performance value 224 is 15 ms, and the predetermined threshold value is 1 ms, comparing module 116 may compare control performance value 222 and modified performance value 224 and determine that a difference between them (i.e., 5 ms) is outside the predetermined threshold variation value of 1 ms. Based on this comparison, comparing module 116 may determine that one or more modifications included in the modified build (e.g., modifications in source code associated with the modified build) included in the comparative performance test introduce a regression into the program.

In other examples, comparing module 116 may determine that a difference between control performance value 222 and modified performance value 224 is not within a predetermined threshold variation value. For example, where control performance value 222 is 10 ms, modified performance value 224 is 9 ms, and the predetermined threshold value is 1 ms, comparing module 116 may compare control performance value 222 and modified performance value 224 and determine that a difference between them (i.e., −1 ms) is outside the predetermined threshold variation value of 1 ms. Based on this comparison, comparing module 116 may determine that one or more modifications included in the modified build included in the comparative performance test do not introduce a regression into the program.

Figure 14:
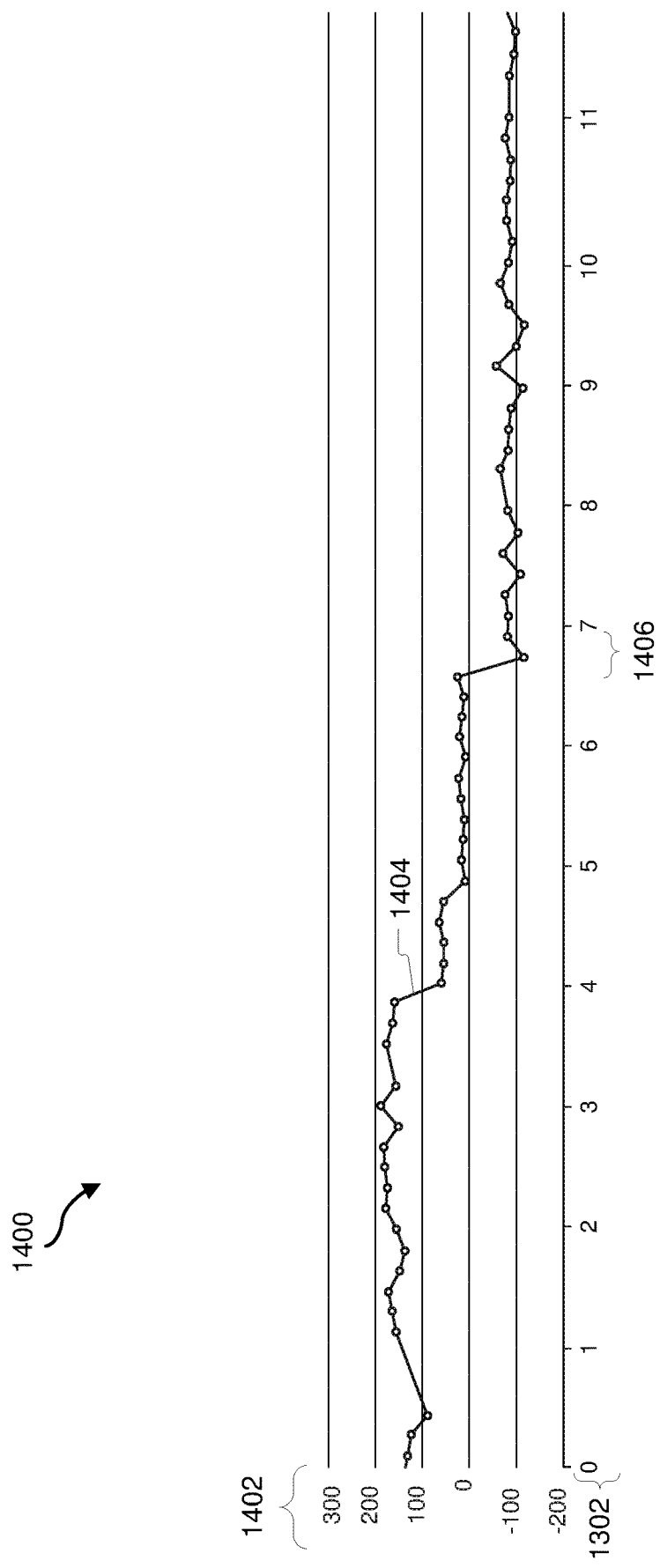
FIG. 14 illustrates a comparison of exemplary performance test results tracked by a system improving comparative performance test results of mobile applications.

FIG. 14 illustrates a chart 1400 of a comparison of exemplary performance test results that an exemplary system for improving comparative performance test results of mobile applications may perform in accordance with the systems and methods described herein. Chart 1400 includes comparative performance test axis 1302 from chart 1300, a relative performance value axis 1402, a comparison line 1404, and a region 1406. As in chart 1300, comparative performance test axis 1302 may indicate each test operation included in a set of test operations included in a comparative performance test. However, in contrast to chart 1300, relative performance value axis 1402 may indicate a relative difference in control performance values and modified performance values rather than the numerical values of the control performance value 222 and/or modified performance value 224. Comparison line 1404 illustrates differences between tracked modified performance values and control performance values.

By identifying a difference between the modified performance values and the control performance values tracked by system 200 during the comparative performance test, one or more modules 102 may determine that one or more changes to source code associated with the program and included in the modified build introduce one or more regressions into the program. For example, at region 1406, comparison line 1404 drops from approximately 0 to approximately −100. This may indicate that a test operation executed using the modified build has a significantly lower performance value than the same test operation executed using the control build. This may indicate that the modified build (e.g., source code associated with the modified build) may include a regression not included in the control build (e.g., source code associated with the control build). Region 1406 may further indicate that a test operation represented by that point on comparative performance test axis 1302 tests a particular operation or function of the program that is associated with source code of the modified build that includes the possible regression. In this and other ways, the systems and methods described herein may improve comparative performance test results of mobile applications by further eliminating noise from comparative performance test results and providing tools for mobile application developers to identify and resolve regressions identified in comparative performance test results.

Figure 15:
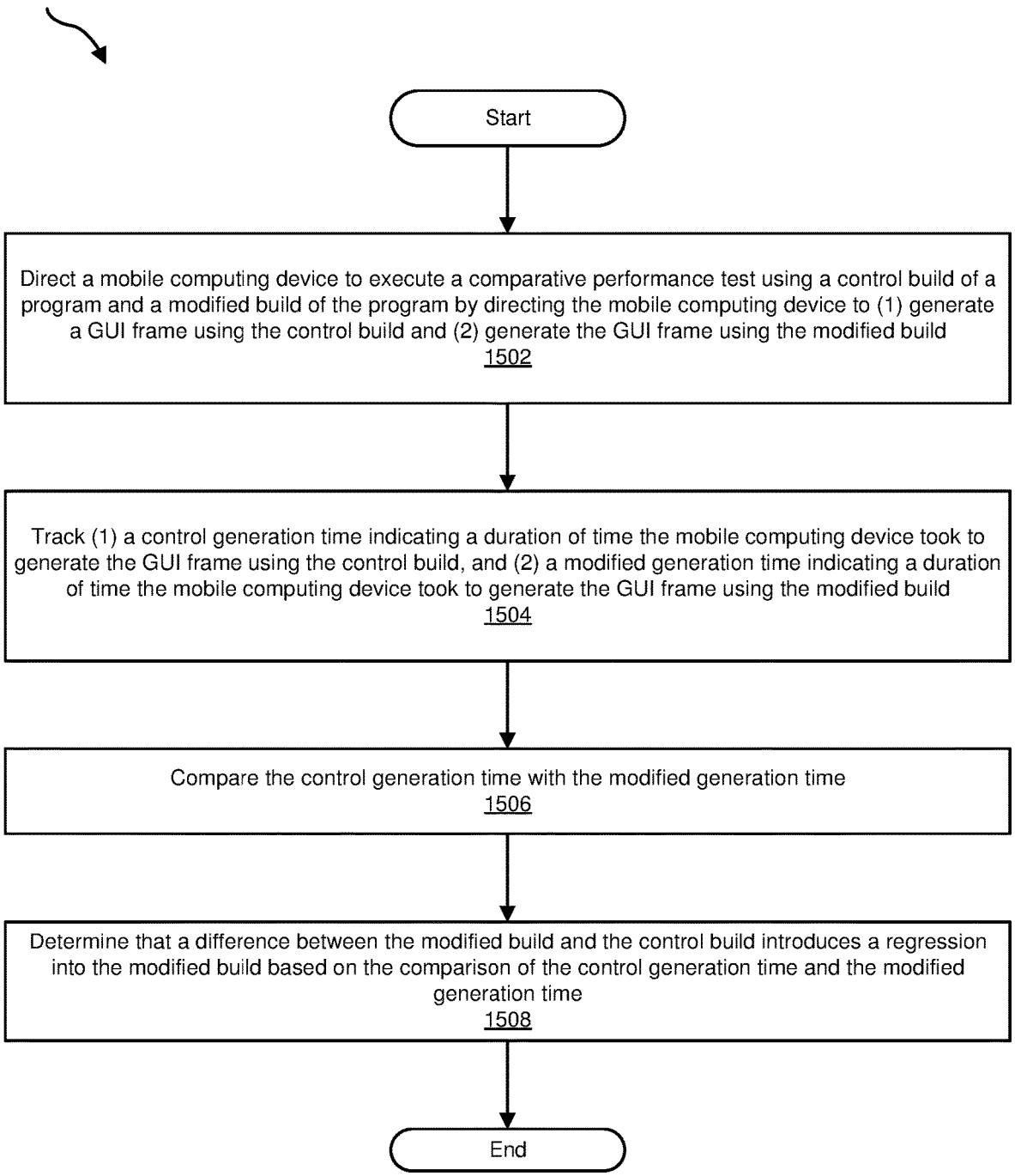
FIG. 15 is a flow diagram of an exemplary method for improving comparative performance test results of mobile applications.

FIG. 15 is a flow diagram of another exemplary computer-implemented method 1500 for improving comparative performance test results of mobile applications. The operations shown in FIG. 15 may be performed by any suitable computer-executable code and/or computing system, including system 100 in FIG. 1, system 200 in FIG. 2, and/or variations or combinations of one or more of the same. In one example, each of the operations shown in FIG. 15 may represent an algorithm whose structure includes and/or is represented by multiple sub-operations, examples of which are provided in greater detail herein.

As illustrated in FIG. 1500, at step 1502, one or more of the systems described herein may direct a mobile computing device to execute a comparative performance test using a control build of a program and a modified build of the program by directing the mobile computing device to (1) generate a GUI frame using the control build, and (2) generate the GUI frame using the modified build. For example, directing module 106 may, as part of testing server 202 in FIG. 2, direct mobile computing device 204 to execute a comparative performance test using a control build of a program and a modified build of the program by directing mobile computing device 204 to generate a GUI frame using the control build, and generate the GUI frame using the modified build. Directing module 106 may perform this operation, for example, in any of the ways described herein.

At step 1504, one or more of the systems described herein may track (1) a control generation time indicating a duration of time the mobile computing device took to generate the GUI frame using the control build and (2) a modified generation time indicating a duration of time the mobile computing device took to generate the GUI frame using the modified build. For example, tracking module 114 may, as part of testing server 202 in FIG. 2, track a control generation time indicating a duration of time mobile computing device 204 took to generate the GUI frame using the control build (e.g., control performance value 222) and a modified generation time indicating a duration of time mobile computing device 204 took to generate the GUI frame using the modified build (e.g., modified performance value 224). Tracking module 114 may perform, for example, this operation in any of the ways described herein.

At step 1506, one or more of the systems described herein may compare the control generation time with the modified generation time. For example, comparing module 116 may, as a part of testing server 202 in FIG. 2, compare the control generation time (e.g., control performance value 222) with the modified generation time (e.g., modified performance value 224). Comparing module 116 may, for example, perform this operation in any of the ways described herein.

At step 1508, one or more of the systems described herein may determine that a difference between the modified build and the control build introduces a regression into the modified build based on the comparison of the control generation time and the modified generation time. For example, comparing module 116 and/or determining module 104 may, as part of testing server 202 in FIG. 2, determine that a difference between the modified build and the control build introduces a regression into the modified build based on the comparison of the control generation time and the modified generation time. Comparing module 116 and/or determining module 104 may, for example, perform this operation in any of the ways described herein.

Utilizing GUI frame generation time as a performance value for a comparative performance test may improve comparative performance test results of mobile applications in various ways. For example, GUI frame generation time may be a consistent metric for measuring performance on a specific mobile computing device. Additionally or alternatively, GUI frame generation time may be a useful metric for comparing comparative performance test results across different mobile computing devices having different operational parameters. This may serve to isolate differences in performance introduced by a specific build of software (e.g., a regression introduced in a modified build) from differences in performance across different mobile computing devices.

The systems and methods described herein may improve comparative performance test results for mobile applications in various ways. For example, the systems and methods described herein may increase consistency in performance of a mobile computing device as it executes a comparative performance test by reducing unnecessary resource usage and/or causing the mobile computing device to operate at consistent CPU and/or GPU clock speeds during the comparative performance test. The systems and methods described herein may also remove noise in comparative performance test results by resetting the mobile computing device to a consistent data state before and/or after each test run, and by directing the mobile computing device to write data associated with the comparative performance test to a RAM disk instead of to a physical storage device. The systems and methods described herein may also increase consistency in comparative performance test results by recording and "playing back" network requests and responses during the comparative performance test. The systems and methods described herein may also reduce an impact of variance between builds (e.g., commit/branch variance) by testing control builds versus modified builds.

In addition, the systems and methods described herein may use GUI frame generation time as a consistent measurement heuristic to normalize comparative performance test results across different mobile computing devices. Hence, these and other features of the systems and methods described herein may effectively improve comparative performance test results of mobile applications.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause (e.g., direct) the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive network response data to be transformed, transform the network response data, output a result of the transformation to reduce usage of data storage and/or transmission resources, use the result of the transformation to reduce usage of data storage and/or transmission resources, and store the result of the transformation to reduce usage of data storage and/or transmission resources. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    directing, by a performance test management system, a mobile computing device to execute a comparative performance test using a control build of a program and a modified build of the program by directing the mobile computing device to:
        generate a GUI frame using the control build;
        generate the GUI frame using the modified build; and
        write data generated by the control build of the program and the modified build of the program to a random-access memory (RAM) drive of the mobile computing device during the execution of the comparative performance test;
    preventing, by the performance test management system, the mobile computing device from writing the data generated by the control build of the program and the data generated by the modified build of the program to a physical drive during the execution of the comparative performance test;
    tracking, by the performance test management system:
        a control generation time indicating a duration of time the mobile computing device took to generate the GUI frame using the control build; and
        a modified generation time indicating a duration of time the mobile computing device took to generate the GUI frame using the modified build;
    comparing, by the performance test management system, the control generation time with the modified generation time; and
    determining, by the performance test management system, that a difference between the modified build and the control build introduces a regression into the modified build based on comparing the control generation time and the modified generation time.

2. The computer-implemented method of claim 1, wherein:
    the method further comprises determining, by the performance test management system, an optimum testing configuration for the mobile computing device;
    the mobile computing device comprises:
        a central processing unit (CPU); and
        a graphics processing unit (GPU); and
    the optimum testing configuration comprises:
        a specified CPU clock speed; and
        a specified GPU clock speed; and
    when the mobile computing device executes the comparative performance test and the CPU operates at the specified CPU clock speed during the execution of the comparative performance test and the GPU operates at the specified GPU clock speed during the execution of the comparative performance test, a thermal throttling feature of the mobile computing device is not engaged during the execution of the comparative performance test.

3. The computer-implemented method of claim 2, wherein determining the optimum testing configuration for the mobile computing device comprises identifying the specified CPU clock speed and the specified GPU clock speed based on a previous execution of the comparative performance test by the mobile computing device.

4. The computer-implemented method of claim 2, wherein:
    determining the optimum testing configuration comprises identifying a feature of the mobile computing device that, when engaged during the execution of the comparative performance test, causes an inconsistent result in the comparative performance test; and
    directing the mobile computing device to operate in accordance with the optimum testing configuration comprises directing the mobile computing device to disable the feature.

5. The computer-implemented method of claim 4, wherein the feature of the mobile computing device that, when engaged during the execution of the comparative performance test, causes an inconsistent result in the comparative performance test comprises at least one of:
    a feature of an operating system associated with the mobile computing device;
    a feature of a program configured to be executed by the mobile computing device;
    a gyroscope sensor;
    a global positioning system sensor;
    an accelerometer;
    a proximity sensor;
    a barometer;
    a network interface; or
    a security sensor.

6. The computer-implemented method of claim 1, wherein directing the mobile computing device to execute the comparative performance test further comprises:
    setting the mobile computing device to a starting data state associated with the comparative performance test;

directing the mobile computing device to execute, at least once, a set of test operations using the control build of the program;

resetting, after each execution of the set of test operations using the control build of the program, the mobile computing device to the starting data state;

directing the mobile computing device to execute, at least once, the set of test operations using the modified build of the program; and resetting, after each execution of the set of test operations using the modified build of the program, the mobile computing device to the starting data state.

7. The computer-implemented method of claim 1, further comprising:

recording, by the performance test management system during a warm-up period of the comparative performance test, a network response directed to the mobile computing device from a network computing device external to the mobile computing device in response to an initial network request sent by the mobile computing device during the warm-up period of the comparative performance test;

detecting, by the performance test management system during an evaluation period of the comparative performance test, a subsequent network request sent by the mobile computing device that corresponds to the initial network request sent by the mobile computing device during the warm-up period; and sending, by the performance test management system during the evaluation period of the comparative performance test, the network response to the mobile computing device in response to detecting the subsequent network request sent by the mobile computing device.

8. The computer-implemented method of claim 7, further comprising preventing, by the performance test management system, the mobile computing device from receiving a subsequent network response from the network computing device during the evaluation period of the comparative performance test.

9. The computer-implemented method of claim 7, wherein:

the initial network request comprises a GRAPHQL query; and the network response comprises a response to the GRAPHQL query.

10. The method of claim 9, further comprising removing, by the performance test management system, a part of the response to the GRAPHQL query from the network response prior to sending the network response to the mobile computing device.

11. A system comprising:

a directing module, stored in memory, that:

directs a mobile computing device to execute a comparative performance test using a control build of a program and a modified build of the program by directing the mobile computing device to:

generate a GUI frame using the control build;
generate the GUI frame using the modified build; and write data generated by the control build of the program and the modified build of the program to a random-access memory (RAM) drive of the mobile computing device during the execution of the comparative performance test; and prevents the mobile computing device from writing the data generated by the control build of the program and the data generated by the modified build of the program to a physical drive during the execution of the comparative performance test;

a tracking module, stored in memory, that tracks:

a control generation time indicating a duration of time the mobile computing device took to generate the GUI frame using the control build; and a modified generation time indicating a duration of time the mobile computing device took to generate the GUI frame using the modified build;

a comparing module, stored in memory, that:

compares the control generation time with the modified generation time;

determines that a difference between the modified build and the control build introduces a regression into the modified build based on comparing the control generation time and the modified generation time; and at least one physical processor that executes the directing module, the tracking module, and the comparing module.

12. The system of claim 11, wherein:

the system further comprises a determining module that determines an optimum testing configuration for the mobile computing device;

the mobile computing device comprises:

a central processing unit (CPU); and
a graphics processing unit (GPU); and the optimum testing configuration comprises:

a specified CPU clock speed; and
a specified GPU clock speed; and when the mobile computing device executes the comparative performance test and the CPU operates at the specified CPU clock speed during the execution of the comparative performance test and the GPU operates at the specified GPU clock speed during the execution of the comparative performance test, the directing module further prevents a thermal throttling feature of the mobile computing device from engaging during the execution of the comparative performance test.

13. The system of claim 12, wherein the determining module determines the optimum testing configuration for the mobile computing device by identifying the specified CPU clock speed and the specified GPU clock speed based on a previous execution of the comparative performance test by the mobile computing device.

14. The system of claim 12, wherein:

the determining module determines the optimum testing configuration by identifying a feature of the mobile computing device that, when engaged during the execution of the comparative performance test, causes an inconsistent result in the comparative performance test; and the directing module further directs the mobile computing device to operate in accordance with the optimum testing configuration by directing the mobile computing device to disable the feature.

15. The system of claim 14, wherein the feature of the mobile computing device that, when engaged during the execution of the comparative performance test, causes an inconsistent result in the comparative performance test comprises at least one of:

a feature of an operating system associated with the mobile computing device;

a feature of a program configured to be executed by the mobile computing device;

a gyroscope sensor;

a global positioning system sensor;

an accelerometer;

a proximity sensor;

a barometer;

a network interface; or a security sensor.

16. The system of claim 11, wherein the directing module further directs the mobile computing device to execute the comparative performance test by:

setting the mobile computing device to a starting data state associated with the comparative performance test;

directing the mobile computing device to execute, at least once, a set of test operations using the control build of the program;

resetting, after each execution of the set of test operations using the control build of the program, the mobile computing device to the starting data state;

directing the mobile computing device to execute, at least once, the set of test operations using the modified build of the program; and resetting, after each execution of the set of test operations using the modified build of the program, the mobile computing device to the starting data state.

17. The system of claim 11, wherein:

the system further comprises:

a recording module, stored in memory, that records, during a warm-up period of the comparative performance test, a network response directed to the mobile computing device from a network computing device external to the mobile computing device in response to an initial network request sent by the mobile computing device during the warm-up period of the comparative performance test;

a detecting module that detects, during an evaluation period of the comparative performance test, a subsequent network request sent by the mobile computing device that corresponds to the initial network request sent by the mobile computing device during the warm-up period;

a sending module, stored in memory, that sends, during the evaluation period of the comparative performance test, the network response to the mobile computing device in response to detecting the subsequent network request sent by the mobile computing device; and the physical processor further executes the recording module, the detecting module, and the sending module.

18. A non-transitory computer-readable medium comprising instructions that, when executed by at least one processor of a computing system, cause the computing system to:

direct a mobile computing device to execute a comparative performance test using a control build of a program and a modified build of the program by directing the mobile computing device to:

generate a GUI frame using the control build;

generate the GUI frame using the modified build; and write data generated by the control build of the program and the modified build of the program to a random-access memory (RAM) drive of the mobile computing device during the execution of the comparative performance test;

prevent the mobile computing device from writing the data generated by the control build of the program and the data generated by the modified build of the program to a physical drive during the execution of the comparative performance test;

track:

a control generation time indicating a duration of time the mobile computing device took to generate the GUI frame using the control build; and a modified generation time indicating a duration of time the mobile computing device took to generate the GUI frame using the modified build;

compare the control generation time with the modified generation time; and determine that a difference between the modified build and the control build introduces a regression into the modified build based on comparing the control generation time and the modified generation time.

* * * * *